United States Patent
Koyama et al.

(10) Patent No.: US 8,786,588 B2
(45) Date of Patent: Jul. 22, 2014

(54) DISPLAY DEVICE AND DRIVING METHOD THEREOF

(75) Inventors: Jun Koyama, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 650 days.

(21) Appl. No.: 13/030,184

(22) Filed: Feb. 18, 2011

(65) Prior Publication Data

US 2011/0210957 A1 Sep. 1, 2011

(30) Foreign Application Priority Data

Feb. 26, 2010 (JP) ................................. 2010-041544

(51) Int. Cl.
*G06F 3/038* (2013.01)

(52) U.S. Cl.
USPC ............... 345/211; 345/87; 345/99; 345/212; 345/213

(58) Field of Classification Search
CPC . G06F 1/3218; G06F 1/3265; G09G 2310/08; G09G 2310/0202; G09G 2310/0286; G09G 2320/103; G09G 2330/021; G09G 3/3611; Y02B 60/1242
USPC .............................. 345/87, 99, 212, 213, 211
See application file for complete search history.

(56) References Cited

U.S. PATENT DOCUMENTS

| | | | |
|---|---|---|---|
| 5,534,884 A | 7/1996 | Mase et al. | |
| 5,731,856 A | 3/1998 | Kim et al. | |
| 5,744,864 A | 4/1998 | Cillessen et al. | |
| 5,982,471 A | 11/1999 | Hirakata et al. | |
| 6,294,274 B1 | 9/2001 | Kawazoe et al. | |

(Continued)

FOREIGN PATENT DOCUMENTS

| | | |
|---|---|---|
| EP | 1 737 044 A1 | 12/2006 |
| EP | 2 226 847 A2 | 9/2010 |

(Continued)

OTHER PUBLICATIONS

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

(Continued)

*Primary Examiner* — Amare Mengistu
*Assistant Examiner* — Jennifer Zubajlo
(74) *Attorney, Agent, or Firm* — Fish & Richardson P.C.

(57) ABSTRACT

In a still image display mode, a driving signal and power supply voltage are supplied to a first driver circuit and a driving signal and power supply voltage are supplied to a second driver circuit, and an image signal is output to n pixels. After that, at least the supply of the driving signal and the power supply voltage to the second driver circuit is stopped and an image of the pixel portion based on the image signal is held as a still image. A series of these operations is performed N (N is a natural number) times. In the case where N is 2 or more, stopping the supply of the driving signal and the power supply voltage to the second driver circuit in a K-th (K is a natural number, $2 \leq K \leq N$) period is set longer than that in a (K−1)-th period.

24 Claims, 10 Drawing Sheets

(56) References Cited

U.S. PATENT DOCUMENTS

| | | | |
|---|---|---|---|
| 6,563,174 B2 | 5/2003 | Kawasaki et al. |
| 6,639,246 B2 | 10/2003 | Honda |
| 6,727,522 B1 | 4/2004 | Kawasaki et al. |
| 6,927,456 B2 | 8/2005 | Honda |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,286,108 B2 | 10/2007 | Tsuda et al. |
| 7,297,977 B2 | 11/2007 | Hoffman et al. |
| 7,321,353 B2 | 1/2008 | Tsuda et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,601,984 B2 | 10/2009 | Sano et al. |
| 7,674,650 B2 | 3/2010 | Akimoto et al. |
| 7,732,819 B2 | 6/2010 | Akimoto et al. |
| 7,791,072 B2 | 9/2010 | Kumomi et al. |
| 7,791,074 B2 | 9/2010 | Iwasaki |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0020065 A1* | 1/2003 | Honda ............................. 257/67 |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0056253 A1* | 3/2004 | Honda ............................. 257/72 |
| 2004/0127038 A1 | 7/2004 | Carcia et al. |
| 2005/0017302 A1 | 1/2005 | Hoffman |
| 2005/0151729 A1 | 7/2005 | Akimoto et al. |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0186267 A1* | 8/2008 | Mamba et al. .................. 345/87 |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0284970 A1 | 11/2008 | Ishitani |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0237391 A1* | 9/2009 | Yanagi et al. .................. 345/213 |
| 2009/0261325 A1 | 10/2009 | Kawamura et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |

FOREIGN PATENT DOCUMENTS

| | | | |
|---|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-182619 A | 6/2002 |
| JP | 2002-289859 A | 10/2002 |
| JP | 2003-086000 A | 3/2003 |
| JP | 2003-086808 A | 3/2003 |
| JP | 2004063717 A | 2/2004 |
| JP | 2004-103957 A | 4/2004 |
| JP | 2004-273614 A | 9/2004 |
| JP | 2004-273732 A | 9/2004 |
| JP | 2008176159 A | 7/2008 |
| WO | 2004/114391 A1 | 12/2004 |
| WO | 2008015814 A1 | 2/2008 |

OTHER PUBLICATIONS

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using Castep," Zeitschrift fur Kristallographie, 2005, vol. 220, pp. 567-570.

(56) References Cited

OTHER PUBLICATIONS

Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.
Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.
Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.
Fortunato, E et al., "Wide-Bandgap High-Mobility ZnO Thin-Film Transistors Produced At Room Temperature," Appl. Phys. Lett. (Applied Physics Letters), Sep. 27, 2004, vol. 85, No. 13, pp. 2541-2543.
Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.
Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.
Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.
Hayashi, R et al., "42.1: Invited Paper: Improved Amorphous In—Ga—Zn—O TFTs," SID Digest '08 : SID International Symposium Digest of Technical Papers, May 20, 2008, vol. 39, pp. 621-624.
Hirao, T et al., "Novel Top-Gate Zinc Oxide Thin-Film Transistors (ZnO TFTs) for AMLCDs," Journal of the SID , 2007, Vol, 15, No. 1, pp. 17-22.
Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.
Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.
Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.
Ikeda., T et al., "Full-Functional System Liquid Crystal Display Using CG-Silicon Technology," SID Digest '04 : SID International Symposium Digest of Technical Papers, 2004, vol. 35, pp. 860-863.
Janotti, A et al., "Native Point Defects in ZnO," Phys. Rev. B (Physical Review. B), 2007, vol. 76, pp. 165202-1-165202-22.
Janotti, A et al., "Oxygen Vacancies in ZnO," Appl. Phys. Lett. (Applied Physics Letters), 2005, vol. 87, pp. 122102-1-122102-3.
Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.
Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.
Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.
Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.
Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.
Kikuchi, H et al., "Polymer-Stabilized Liquid Crystal Blue Phases,", Nature Materials, Sep. 1, 2002, vol. 1, pp. 64-68.
Kim, S et al., "High-Performance oxide thin film transistors passivated by various gas plasmas," The Electrochemical Society, 214th ECS Meeting, 2008, No. 2317, 1 page.
Kimizuka, N et al., "Spinel,YbFe2O4, and Yb2Fe3O7 Types of Structures for Compounds in the In2O3 and Sc2O3-A2O3-BO Systems [A; Fe, Ga, or Al; B: Mg, Mn, Fe, Ni, Cu,or Zn] At Temperatures Over 1000° C., " Journal of Solid State Chemistry, 1985, vol. 60, pp. 382-384.
Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3-ZnGa2O4-ZnO System," Journal of Solid State Chemistry, Apr. 1, 1995, vol. 116, No. 1, pp. 170-178.
Kitzerow, H et al., "Observation of Blue Phases in Chiral Networks," Liquid Crystals, 1993, vol. 14, No. 3, pp. 911-916.
Kurokawa, Y et al., "UHF RFCPUS on Flexible and Glass Substrates for Secure RFID Systems," Journal of Solid-State Circuits , 2008, vol. 43, No. 1, pp. 292-299.
Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.
Lee, H et al., "Current Status of, Challenges to, and Perspective View of AM-OLED," IDW '06 : Proceedings of the 13th International Display Workshops, Dec. 7, 2006, pp. 663-666.
Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.
Lee, M et al., "15.4: Excellent Performance of Indium-Oxide-Based Thin-Film Transistors by DC Sputtering," SID Digest '09 : SID International Symposium Digest of Technical Papers, May 31, 2009, pp. 191-193.
Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.
Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.
Meiboom, S et al., "Theory of the Blue Phase of Cholesteric Liquid Crystals," Phys. Rev. Lett. (Physical Review Letters), May 4, 1981, vol. 46, No. 18, pp. 1216-1219.
Miyasaka, M, "Suftla Flexible Microelectronics on Their Way to Business," SID Digest '07 : SID International Symposium Digest of Technical Papers, 2007, vol. 38, pp. 1673-1676.
Mo, Y et al., "Amorphous Oxide TFT Backplanes for Large Size AMOLED Displays," IDW '08 : Proceedings of the 6th International Display Workshops, Dec. 3, 2008, pp. 581-584.
Nakamura, "Synthesis of Homologous Compound with New Long-Period Structure," Nirim Newsletter, Mar. 1995, vol. 150, pp. 1-4 with English translation.
Nakamura, M et al., "The phase relations in the In2O3-Ga2ZnO4-ZnO system at 1350° C.," Journal of Solid State Chemistry, Aug. 1, 1991, vol. 93, No. 2, pp. 298-315.
Nomura, K et al., "Thin-Film Transistor Fabricated in Single-Crystalline Transparent Oxide Semiconductor," Science, May 23, 2003, vol. 300, No. 5623, pp. 1269-1272.
Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.
Nomura, K et al., "Room-Temperature Fabrication of Transparent Flexible Thin-Film Transistors Using Amorphous Oxide Semiconductors," Nature, Nov. 25, 2004, vol. 432, pp. 488-492.
Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.

(56) References Cited

OTHER PUBLICATIONS

Nowatari, H et al., "60.2: Intermediate Connector With Suppressed Voltage Loss for White Tandem OLEDS," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 In. QVGA AMOLED Display Using In—Ga—Zn—Oxide TFTs With a Novel Passivation Layer," SID Digest '09 : SID International Symposium Digest of Technical Papers, May 31, 2009, pp. 284-287.

Ohara, H et al., "Amorphous In—Ga—Zn—Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.

Osada, T et al., "Development of Driver-Integrated Panel Using Amorphous In—Ga—Zn—Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci, Technol. B (Journal of Vacuum Science & Technology B), Mar. 1, 2003, vol. 21. No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park. J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al.. "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium—Gallium—Zinc Oxide TFTs and Their Application for Large Size AMOLED," AM-FPD '08 Digest of Technical Papers, Jul. 2, 2008, pp. 275-278.

Park. S et al., "Challenge to Future Displays: Transparent AM-OLED Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display With Driver Circuit Using Amorphous In—Ga—Zn—Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3-In2O3-ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

Kazuhiko Tsuda et al.; "Ultra low power consumption technologies for mobile TFT-LCDs"; IDW '02 : Proceedings of the 9th International Display Workshops; Dec. 4, 2002; pp. 295-298.

International Search Report (Application No. PCT/JP2011/052461) Dated Mar. 1, 2011.

Written Opinion (Application No. PCT/JP2011/052461) Dated Mar. 1, 2011.

\* cited by examiner

DISPLAY DEVICE AND DRIVING METHOD THEREOF

TECHNICAL FIELD

One embodiment of the present invention relates to a display device and a method for driving the same.

BACKGROUND ART

In recent years, low power-consumption display devices such as low power-consumption liquid crystal display devices and electroluminescent display devices (also referred to as EL display devices) have been developed.

For example, as one of methods for reducing power consumption of the above display device, a technique can be given in which an interval between image rewriting operations in a pixel in displaying a still image is longer than an interval between image rewriting operations in the pixel in displaying a moving image and thus unnecessary image rewriting operation in displaying a still image is reduced and poser consumption of the display device is reduced (for example, Patent Document 1).

REFERENCE

[Patent Document 1] Japanese Published Patent Application No. 2002-182619

DISCLOSURE OF INVENTION

However, in the conventional method for reducing power consumption which is disclosed in Patent Document 1, an interval between image rewriting operations in a pixel in displaying a still image is as short as several seconds or shorter; therefore, it cannot be said that power consumption can be sufficiently reduced.

Moreover, in the conventional method for reducing power consumption which is disclosed in Patent Document 1, an interval between rewriting operations is fixed. For example, even when a user does not operate the display device, an image rewriting operation (also referred to as refreshing) is performed at regular intervals, so that power is consumed accordingly.

An object of one embodiment of the present invention is to reduce power consumption of a display device.

In one embodiment of the present invention, in the case where a still image is displayed, after an image writing operation, output of a signal to a driver circuit is stopped and the written image is held as a still image. Moreover, when image rewriting operation is performed twice or more, the length of a period in which output of a signal to the driver circuit is stopped is adjusted.

In one embodiment of the present invention, in the case where a still image is displayed, when image rewriting operation is performed twice or more, the length of a period in which output of a signal to a driver circuit is stopped is adjusted depending on whether a user performs image rewriting operation.

One embodiment of the present invention is a method for driving a display device including a driver circuit portion and a pixel portion. The driver circuit portion includes a first driver circuit for outputting a scan signal and a second driver circuit for outputting an image signal. The pixel portion includes n (n is a natural number) pixels whose display state is controlled when the scan signal is input and the image signal is input in accordance with the scan signal. The display device has a moving image display mode for displaying a moving image by the pixel and a still image display mode for displaying a still image by the pixel. In the still image display mode, output of a driving signal and power supply voltage to the first driver circuit is started and output of a driving signal and power supply voltage to the second driver circuit is started, whereby the image signal is output to the n pixels. Then, at least the output of the driving signal and the power supply voltage to the second driver circuit is stopped and an image of the pixel portion based on the input image signal is held as the still image. A series of these operations is performed N (N is a natural number) times. In the case where N is 2 or more, a period in which K-th (K is a natural number greater than or equal to 2 and less than or equal to N) output of the driving signal and the power supply voltage to the second driver circuit is stopped is set longer than a period in which (K−1)-th output of the driving signal and the power supply voltage to the second driver circuit is stopped.

One embodiment of the present invention is a method for driving a display device including a driver circuit portion and a pixel portion. The driver circuit portion includes a first driver circuit for outputting a scan signal and a second driver circuit for outputting an image signal. The pixel portion includes n (n is a natural number) pixels whose display state is controlled when the scan signal is input and the image signal is input in accordance with the scan signal. The display device has a moving image display mode for displaying a moving image by the pixel and a still image display mode for displaying a still image by the pixel. In the still image display mode, output of a start signal, a clock signal, and power supply voltage to the first driver circuit is started, and output of a start signal, a clock signal, and power supply voltage to the second driver circuit is started, whereby the image signal is output to the n pixels. Then, at least the output of the start signal, the clock signal, and the power supply voltage to the second driver circuit is stopped, and an image of the pixel portion based on the input image signal is held as a still image. A series of these operations is performed N (N is a natural number) times. In the case where N is 2 or more, a period in which K-th (K is a natural number greater than or equal to 2 and less than or equal to N) output of the start signal, the clock signal, and the power supply voltage to the second driver circuit is stopped is set longer than a period in which (K−1)-th output of the start signal, the clock signal, and the power supply voltage to the second driver circuit is stopped.

One embodiment of the present invention is a display device including a driver circuit portion and a pixel portion. The driver circuit portion includes a CPU which is supplied with an operation signal, generates a first control signal and a second control signal in accordance with the input operation signal, and outputs the generated first control signal and the generated second control signal; a display control circuit to which the first control signal and the second control signal are input; a first driver circuit which outputs a scan signal when a start signal, a clock signal, and power supply voltage are input through the display control circuit in accordance with the first control signal; and a second driver circuit which outputs an image signal when a start signal, a clock signal, and power supply voltage are input through the display control circuit in accordance with the second control signal. The pixel portion includes n (n is a natural number) pixels whose display state is controlled when the scan signal is input and the image signal is input in accordance with the scan signal. The CPU includes a counting circuit which is supplied with a reference clock signal, counts the number of pulses of the reference clock signal in each period set in accordance with the operation signal, and outputs data of the counted value in each period as a signal; a latch circuit which is supplied with the data signal of the counted value, and outputs the supplied data signal of the counted value after holding it for a certain period; an arithmetic circuit which is supplied with the data signal of the counted value through the latch circuit, and generates signals to be the first control signal and the second control signal in accordance with the supplied data signal of the counted value; and an output circuit which adjusts the signals generated in the arithmetic circuit and outputs the adjusted signals to the display control circuit as the first control signal and the second control signal.

Note that in this specification, a moving image refers to images which are recognized as an image that is moving by the human eye by switching the images at high speed in a plurality of frame periods.

In this specification, a still image refers to images which are recognized, by the human eye, as an image that does not change even in the case where the images are switched at high speed in a plurality of frame periods.

According to one embodiment of the present invention, an interval between image rewriting operations in displaying a still image can be set long as necessary, so that power consumption can be reduced.

BEST MODE FOR CARRYING OUT THE INVENTION

Hereinafter, embodiments of the present invention will be described with reference to the drawings. Note that the present invention is not limited to the following description, and it will be easily understood by those skilled in the art that the mode and detail can be variously changed without departing from the sprit and scope of the present invention. Thus, the present invention should not be interpreted as being limited to the description of the embodiments.

Embodiment 1

In this embodiment, a display device capable of displaying a moving image and a still image and a method for driving the display device will be described.

An example of the display device in this embodiment will be described with reference to FIGS. 1A to 1C.

First, an example of the structure of the display device of this embodiment will be described with reference to FIG. 1A. FIG. 1A is a block diagram illustrating an example of the structure of the display device of this embodiment.

Figure 1A:
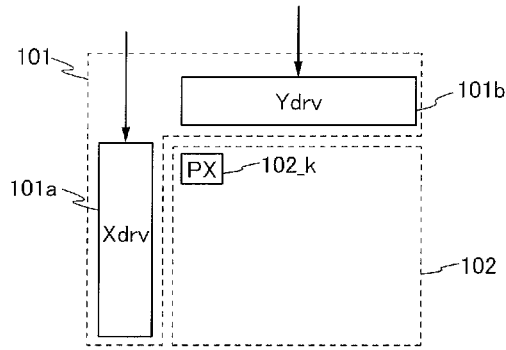
FIGS. 1A to 1C are a view and charts illustrating a display device in Embodiment 1.

The display device illustrated in FIG. 1A includes a driver circuit portion 101 provided with driver a circuit and a pixel portion 102 provided with a pixel.

The driver circuit portion 101 includes a first driver circuit (also referred to as Xdrv) 101a and a second driver circuit (also referred to as Ydrv) 101b.

The first driver circuit 101a has a function of outputting a scan signal SCN. The first driver circuit 101a selects pixels to which an image signal IMG is input in accordance with the scan signal SCN and scans. The first driver circuit 101a starts operation when a signal for operating the first driver circuit 101a (also referred to as a driving signal of the first driver circuit 101a) and power supply voltage are input. As the driving signal of the first driver circuit 101a, a start signal, a clock signal, or the like can be given, for example. The first driver circuit 101a is formed using a shift register, for example. Note that the first driver circuit 101a may be formed using a plurality of driver circuits.

The second driver circuit 101b has a function of outputting an image signal IMG. The second driver circuit 101b outputs the image signal IMG to the pixel selected by the first driver circuit 101a. The second driver circuit 101b starts operation when a signal for operating the second driver circuit 101b (also referred to as a driving signal of the second driver circuit 101b) and power supply voltage are input, for example. As the driving signal of the second driver circuit 101b, a start signal, a clock signal, or the like can be given. The second driver circuit 101b is formed using a shift register, for example. Note that the second driver circuit 101b may be formed using a plurality of driver circuits.

Note that the term "voltage" generally means a difference between potentials at two points (also referred to as a potential difference). However, values of both a voltage and a potential are represented using volt (V) in a circuit diagram or the like in some cases, so that it is difficult to discriminate between them. Thus, in this specification, a potential difference between a potential at one point and a potential to be the reference (also referred to as the reference potential) is sometimes used as a voltage at the point unless otherwise specified.

The operations of the first driver circuit 101a and the second driver circuit 101b can be controlled with a display control circuit, for example.

The display control circuit is a circuit for controlling the timing when the driving signal of the first driver circuit 101a and the power supply voltage are output to the first driver circuit 101a and the timing when the driving signal of the second driver circuit 101b and the power supply voltage are output to the second driver circuit 101b. The operation of the display control circuit is controlled by, for example, a CPU.

In addition to the operation of the display control circuit, the operations of the first driver circuit 101a and the second driver circuit 101b can be controlled in accordance with an operation signal. The operation signal is a signal for controlling image rewriting operation of a display device and for outputting a pulse indicating that operation is performed, for example, when a user performs image rewriting operation of the display device (e.g., button operation, touch operation on a touch panel, text inputting operation by a keyboard).

The pixel portion 102 includes n (n is a natural number) pixels.

To a pixel 102_k (k is a natural number greater than or equal to 1 and less than or equal to n), the scan signal SCN is input and the image signal IMG is input in accordance with voltage of the scan signal SCN. The pixel 102_k has a function of performing display operation in accordance with the input image signal IMG.

The pixel 102_k includes a transistor and a display element, for example. The transistor has a function of controlling whether the image signal IMG is input to the pixel 102_k by being turned on or off in accordance with the voltage of the scan signal SCN. The display element has a function of changing a display state in accordance with voltage of the input image signal IMG.

Note that in this specification, the transistor refers to a field-effect transistor including at least a source, a drain, and a gate unless otherwise specified.

A source refers to part of or the whole of a source electrode, or part of or the whole of a source wiring. A conductive layer having a function of both a source electrode and a source wiring is referred to as a source in some cases without distinction between a source electrode and a source wiring.

A drain refers to part of or the whole of a drain electrode, or part of or the whole of a drain wiring. A conductive layer having a function of both a drain electrode and a drain wiring is referred to as a drain in some cases without distinction between a drain electrode and a drain wiring.

A gate refers to part of or the hole of a gate electrode, or part of or the whole of a gate wiring. A conductive layer having a function of both a gate electrode and a gate wiring is referred to as a gate in some cases without distinction between a gate electrode and a gate wiring.

Further, a source and a drain of a transistor may interchange with each other depending on the structure, the operating condition, and the like of the transistor; therefore, it is difficult to define which is the source or the drain. Therefore, in this specification, one of a source and a drain of a transistor is referred to as a first terminal, and the other is referred to as a second terminal in some cases. Further, in the case where the source or the drain is referred to as a first terminal or a second terminal, the gate is sometimes referred to as a third terminal.

As the transistor of the pixel 102_k, for example, a transistor having small off-state current can be used. In the transistor, the off-state current per micrometer of channel width is smaller than or equal to 10 aA ($1 \times 10^{-17}$ A), preferably smaller than or equal to 1 aA ($1 \times 10^{-18}$ A), more preferably smaller than or equal to 10 zA ($1 \times 10^{-20}$ A), and still more preferably smaller than or equal to 1 zA ($1 \times 10^{-21}$ A).

With the use of the transistor having small off-state current as the transistor of the pixel 102_k, variations in the display state of a display element, which are caused by off-state current of the transistor, can be suppressed, whereby a period for holding an image corresponding to one writing of image data can be made longer. Therefore, an interval between operations of writing image data can be made longer. For example, the interval between the operations of writing image data can be 10 seconds or longer, preferably 30 seconds or longer, more preferably 1 minute or longer. As the interval between the operations of writing image data is made longer, power consumption can be further reduced.

As the transistor having small off-state current, for example, a transistor including an oxide semiconductor layer serving as a channel formation layer can be used. The oxide semiconductor layer serving as a channel formation layer is an intrinsic (also referred to as i-type) or substantially intrinsic semiconductor layer.

The intrinsic (also referred to as i-type) or substantially intrinsic oxide semiconductor layer can be formed by high purification of an oxide semiconductor layer, for example. Note that high purification is a general idea including at least one of the following cases: the case where hydrogen in an oxide semiconductor layer is removed as much as possible; and the case where oxygen is supplied to an oxide semiconductor layer and defects due to oxygen deficiency of the oxide semiconductor layer are reduced.

Further, as the display element of the pixel 102_k, a liquid crystal element, an electroluminescent element (also referred to as an EL element), or the like can be used, for example.

Next, as an example of a method for driving the display device of this embodiment, an example of a method for driving the display device illustrated in FIG. 1A will be described with reference to FIGS. 1B and 1C. FIGS. 1B and 1C are charts illustrating an example of a method for driving the display device illustrated in FIG. 1A and show states of the second driver circuit 101b and the pixel 102_k.

Figure 1B:
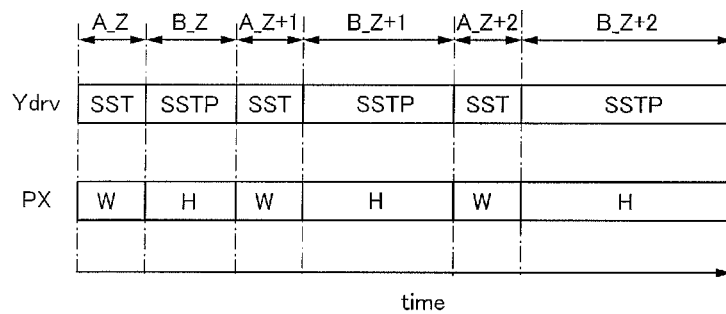
Figure 1C:
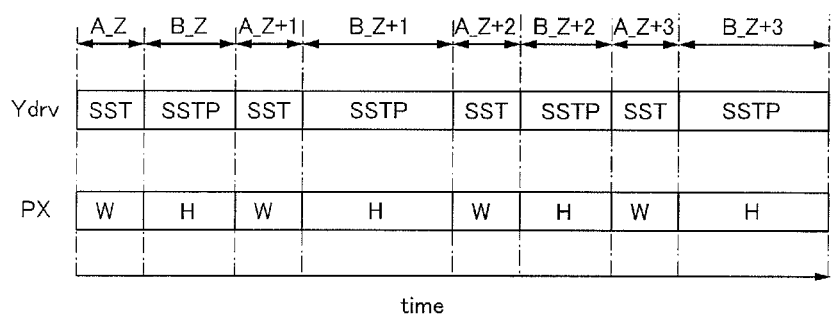

In the example of the method for driving the display device, which is shown in FIGS. 1B and 1C, a period for displaying a moving image and a period for displaying a still image are given. In the period for displaying a still image, operation in a period A and operation in a period B are sequentially performed N (N is a natural number) time. Note that a state of the display device displaying a moving image is also referred to as a moving image display mode, and a state of the display device displaying a still image is also referred to as a still image display mode. The still image display mode also includes a mode of displaying part of a moving image as a still image (also referred to as a simple moving image reproducing mode).

First, in a Z-th period A_Z (Z is a natural number greater than or equal to 1), output of the driving signal and the power supply voltage to the first driver circuit 101a is started, and output of the driving signal and the power supply voltage to the second driver circuit 101b is started. This state is also referred to as a state SST.

At this time, the first driver circuit 101a starts operation. The first driver circuit 101a outputs the scan signal SCN to the pixel 102_k, and sequentially selects the pixels 102_k to which the image signal IMG is input in accordance with the scan signal SCN. Further, the second driver circuit 101b starts output of the image signal IMG to the pixel 102_k selected by the first driver circuit 101a.

The image signal IMG is input to the selected pixel 102_k and a display state of the selected pixel 102_k is set in accordance with the input image signal IMG. Thus, data of the image signal IMG is written to the pixel 102_k. The display state of the pixel 102_k is held for a certain period when the data of the image signal IMG is written to the selected pixel 102_k. This operation is also performed on the other pixels, so that display states of all the pixels can be set. Accordingly, an image based on the data of the image signal IMG is displayed in the pixel portion. At this time, a state where the data of the image signal IMG is written to all the pixels is also referred to as a state W.

Next, in a Z-th period B_Z, the driving signal and the power supply voltage stops being output at least to the second driver circuit 101b. That is, at least output of the driving signal and the power supply voltage to the second driver circuit 101b is stopped. This state is also referred to as SSTP.

At this time, operation of the second driver circuit 101b is stopped, and output of the image signal IMG is stopped.

Further, at this time, the pixel 102_k holds the display state based on the data of the image signal IMG written in the Z-th period A_Z. Thus, during the Z-th period B_Z, the pixel 102_k holds an image based on the data of the image signal IMG written in the Z-th period A_Z as a still image. At this time, a state where the image based on the data of the image signal IMG is held as a still image is also referred to as a state H.

Note that in the Z-th period B_Z, the driving signal and the power supply voltage may stop being output to the first driver circuit 101a. That is, output of the driving signal and the power supply voltage to the first driver circuit 101a may be stopped.

Next, in a (Z+1)-th period A_Z+1, output of the driving signal and the power supply voltage to the first driver circuit 101a is started and output of the driving signal and the power supply voltage to the second driver circuit 101b is started.

At this time, the first driver circuit 101a starts operation. The first driver circuit 101a outputs the scan signal SCN to the pixel 102_k, and sequentially selects the pixels 102_k to which the image signal IMG is input in accordance with the scan signal SCN. Further, the second driver circuit 101b starts output of the image signal IMG.

The image signal IMG is input to the selected pixel 102_k and a display state of the selected pixel 102_k is set in accordance with the input image signal IMG. Thus, data of the image signal IMG is written to the selected pixel 102_k. The display state of the pixel 102_k is held for a certain period when the data of the image signal IMG is written to the selected pixel 102_k. This operation is also performed on the other pixels, so that display states of all the pixels can be set. Accordingly, an image is displayed in the pixel portion.

Next, in a (Z+1)-th period B_Z+1, at least output of the driving signal and the power supply voltage to the second driver circuit 101b is stopped. At this time, the period in which output of the driving signal and the power supply voltage to the second driver circuit 101b is stopped in the (Z+1)-th period B_Z+1 is set longer than the period in which output of the driving signal and the power supply voltage to the second driver circuit 101b is stopped in the Z-th period B_Z.

At this time, operation of the second driver circuit 101b is stopped and output of the image signal IMG is stopped.

Further, at this time, the pixel 102_k holds the display state based on the data of the image signal IMG written in the (Z+1)-th period A_Z+1. Thus, during the (Z+1)-th period B_Z+1, the pixel 102_k holds an image based on the data of the image signal IMG written in the (Z+1)-th period A_Z+1 as a still image. At this time, a period in which the image based on the image signal IMG in the (Z+1)-th period B_Z+1 is held is longer than the period in which the image based on the image signal IMG in the Z-th period B_Z, in accordance with the length of the period in which the output of the driving signal and the power supply voltage to the second driver circuit 101b is stopped in the (Z+1)-th period B_Z+1.

Note that in the (Z+1)-th period B_Z+1, output of the driving signal and the power supply voltage to the first driver circuit 101a may be stopped. At this time, the period in which output of the driving signal and the power supply voltage to the first driver circuit 101a is stopped in the (Z+1)-th period B_Z+1 is set longer than the period in which output of the driving signal and the power supply voltage to the first driver circuit 101a is stopped in the Z-th period B_Z.

Further, in the case where N is 3 or more, for example, in a (Z+2)-th period A_Z+2, output of the driving signal and the power supply voltage to the first driver circuit 101a is started, and output of the driving signal and the power supply voltage to the second driver circuit 101b is started.

At this time, the first driver circuit 101a starts operation. The first driver circuit 101a outputs the scan signal SCN to the pixel 102_k, and sequentially selects the pixels 102_k to which the image signal IMG is input in accordance with the scan signal SCN. Further, the second driver circuit 101b starts output of the image signal IMG.

The image signal IMG is input to the selected pixel 102_k and a display state of the selected pixel 102_k is set in accordance with the input image signal IMG. Thus, data of the image signal IMG is written to the selected pixel 102_k. The display state of the pixel 102_k is held for a certain period when the data of the image signal IMG is written to the selected pixel 102_k. This operation is also performed on the other pixels, so that display states of all the pixels can be set. Accordingly, an image is displayed in the pixel portion.

Next, in a (Z+2)-th period B_Z+2, at least output of the driving signal and the power supply voltage to the second driver circuit 101b is stopped. At this time, the period in which output of the driving signal and the power supply voltage to the second driver circuit 101b is stopped in the (Z+2)-th period B_Z+2 is set longer than the period in which output of the driving signal and the power supply voltage to the second driver circuit 101b is stopped in the (Z+1)-th period B_Z+1.

At this time, operation of the second driver circuit 101b is stopped and output of the image signal IMG is stopped.

Further, at this time, the pixel 102_k holds the display state based on the data of the image signal IMG written in the (Z+2)-th period A_Z+2. Thus, during the (Z+2)-th period B_Z+2, the pixel 102_k holds an image based on the data of the image signal IMG written in the (Z+2)-th period A_Z+2 as a still image. At this time, a period in which the image based on the image signal IMG in the (Z+2)-th period B_Z+2 is held is longer than the period in which the image based on the image signal IMG in the (Z+1)-th period B_Z+1, in accordance with the length of the period in which the output of the driving signal and the power supply voltage to the second driver circuit 101b is stopped in the (Z+2)-th period B_Z+2. This is an example of the method for driving the display device illustrated in FIG. 1A.

Note that in the (Z+2)-th period B_Z+2, output of the driving signal and the power supply voltage to the first driver circuit 101a may be stopped. At this time, the period in which output of the driving signal and the power supply voltage to the first driver circuit 101a is stopped in the (Z+2)-th period B_Z+2 is set longer than the period in which output of the driving signal and the power supply voltage to the first driver circuit 101a is stopped in the (Z+1)-th period B_Z+1.

Further, the display device of this embodiment can change operation in accordance with existence of a pulse of the operation signal.

For example, in the case where N is 2 or more and a pulse of the operation signal is not input, as in the example of the method for driving the display device, which is shown in FIG. 1B, as the operation in the period A and the operation in the period B are repeated, a period in which at least output of the driving signal and the power supply voltage to the second driver circuit 101b is stopped is made longer.

Further, in the case where N is 2 or more and a pulse of the operation signal is input, in accordance with the pulse, output of the driving signal and the power supply voltage to the first driver circuit 101a is started and output of the driving signal and the power supply voltage to the second driver circuit 101b is started. For example, in the case where N is 4 or more, when a pulse of the operation signal is input in a (Z+2)-th period B_Z+2, as illustrated in FIG. 1C, the operation is switched to operation in a (Z+3)-th period A_Z+3; output of the driving signal and the power supply voltage to the first driver circuit 101a is started, output of the driving signal and the power supply voltage to the second driver circuit 101b is started, data of the image signal IMG is written to the pixel 102_k, and then at least output of the driving signal and the power supply voltage to the second driver circuit 101b is stopped in a (Z+3)-th period B_Z+3, and a period in which an image based on the image signal IMG written in the (Z+3)-th period A_Z+3 is held is set longer than a period in which an image based on the image signal IMG in the (Z+2)-th period B_Z+2 is held. The above is an example of a method for driving the display device illustrated in FIG. 1A.

As in the example shown in FIGS. 1A to 1C, in the display device of this embodiment, data of an image signal is written to a pixel in displaying a still image, and then, at least output of a signal for driving a second driver circuit and power supply voltage to the second driver circuit is stopped, and an image based on the data of the image signal written to the pixel is held as a still image. A series of these operations is performed N times. In the case where N is 2 or more, a period in which K-th (K is a natural number greater than or equal to 2 and less than or equal to N) output of the signal for driving the second driver circuit and the power supply voltage to the second driver circuit is stopped is set longer than a period in which (K−1)-th output of the signal for driving the second driver circuit and the power supply voltage to the second driver circuit is stopped. Thus, unnecessary image rewriting operation in displaying a still image can be reduced and power consumption of the display device can be reduced.

Further, in the display device of this embodiment, data of an image signal is written to a pixel in displaying a still image, and then, at least output of a signal for driving a second driver circuit and power supply voltage to the second driver circuit is stopped, and an image based on the data of the image signal written to the pixel is held as a still image. A series of these operations is performed N times. In the case where N is 2 or more and a pulse of an operation signal is not input, a period in which K-th output of the signal for driving the second driver circuit and the power supply voltage to the second driver circuit is stopped is set longer than a period in which (K−1)-th output of the signal for driving the second driver circuit and the power supply voltage to the second driver circuit is stopped. When the pulse of the operation signal is input, output of a driving signal and power supply voltage to a first driver circuit is started, output of the driving signal and the power supply voltage to the second driver circuit is started, and thus, data of the image signal is written to the pixel. Accordingly, for example, when a user operates the display device, the display device is set to an operation display mode and image data is successively written to a pixel. When a user does not operate the display device (e.g., in reading), the display device is set to a still image display mode and driver circuits can be selectively stopped by stop of supply of an image signal to a pixel, or the like. Thus, power consumption can be reduced without hindering actual operation.

Embodiment 2

In this embodiment, as an example of a display device capable of selectively stopping supply of an image signal to a pixel and a method for driving the display device, a liquid crystal display device and a method for driving the liquid crystal display device will be described.

An example of a structure of the display device in this embodiment will be described with reference to FIG. 2.

Figure 2:
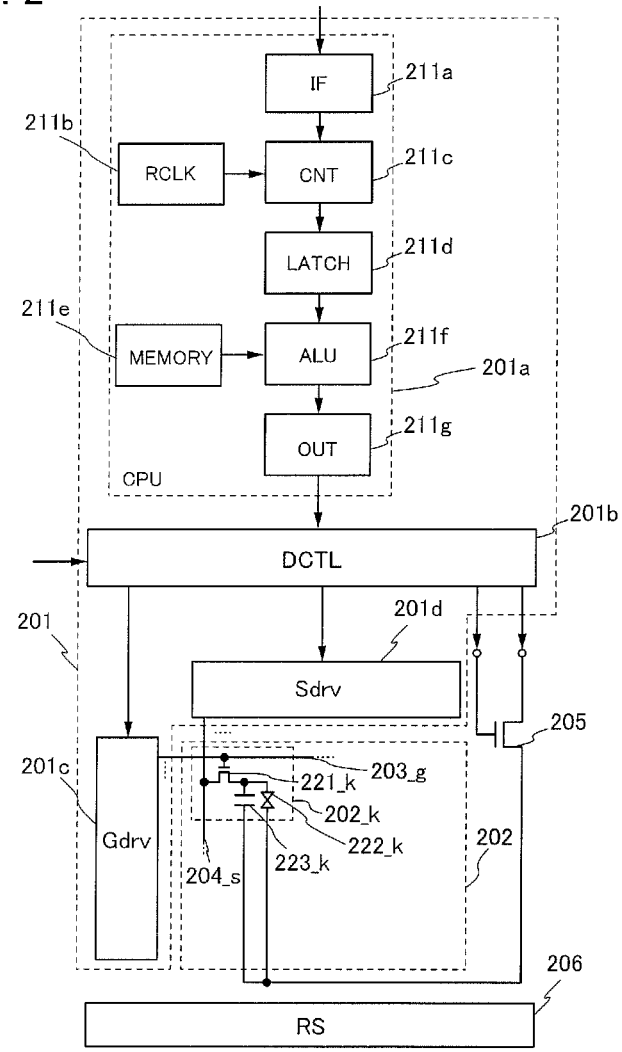
FIG. 2 is a diagram illustrating an example of a structure of a display device in Embodiment 2.

The display device illustrated in FIG. 2 includes a driver circuit portion 201 provided with a driver circuit and a pixel portion 202 provided with a pixel.

The driver circuit portion 201 includes a CPU 201a, a display control circuit (also referred to as DCTL) 201b, a scan signal line driver circuit (also referred to as Gdrv) 201c, and an image signal line driver circuit (also referred to as Sdrv) 201d.

The CPU 201a includes an interface (also referred to as IF) 211a, a reference clock signal generation circuit (also referred to as RCLK) 211b, a counting circuit (also referred to as CNT) 211c, a latch circuit (also referred to as LATCH) 211d, a memory circuit (also referred to as MEMORY) 211e, an arithmetic circuit (also referred to as ALU) 211f, and an output circuit (also referred to as OUT) 211g.

The interface 211a has a function of exchanging signals with an external device by a predetermined method. The interface 211a is electrically connected to an input means which outputs an operation signal, for example. As the input means, a keyboard, a mouse, a touch pad, a pointing device such as a touch panel, or the like can be used. Note that the interface 211a is not necessarily provided in the CPU 201a. An interface which is separately provided may be used as the interface 211a.

The reference clock signal generation circuit 211b has a function of generating a reference clock signal RCK. The reference clock signal generation circuit 211b is not necessarily provided in the CPU 201a. A clock signal generation circuit which is separately provided may be used as the reference clock signal generation circuit 211b. For example, the reference signal generation circuit 211b can be constituted by an oscillator circuit. Alternatively, the reference clock signal generation circuit 211b may be constituted by an oscillator circuit and a divider circuit.

The reference clock signal RCK is input to the counting circuit 211c. The counting circuit 211c has a function of counting the number of pulses of the input reference clock signal RCK in each period set in accordance with a pulse of the operation signal and a function of outputting data of the counted value as a signal. For example, the counting circuit 211c can be constituted by a shift register. With the use of the counting circuit 211c, data of an interval between pluses of the operation signal can be obtained, for example.

The data signal of the counted value is input to the latch circuit 211d from the counting circuit 211c. The latch circuit 211d has a function of outputting the input data signal after holding it for a certain period.

The memory circuit 211e stores data of an interval between image rewriting operations in displaying a still image, which corresponds to the value counted by the counting circuit 211c. Note that the memory circuit 211e is not necessarily provided in the CPU 201a. A memory circuit which is separately provided may be used as the memory circuit 211e.

The data signal of the counted value is input to the arithmetic circuit 211f through the latch circuit 211d. The arithmetic circuit 211f generates a control signal GDCTL and a control signal SDCTL in accordance with the input data signal. The control signal GDCTL is a signal for controlling drive of the scan signal line driver circuit 201c and the control signal SDCTL is a signal for controlling drive of the image signal line driver circuit 201d.

The output circuit 211g has a function of outputting the control signal GDCTL and the control signal SDCTL to the outside. At this time, if necessary, the output circuit 211g adjusts voltage of the control signal GDCTL and voltage of the control signal SDCTL, for example. The output circuit 211g is constituted by a buffer circuit or the like.

In the CPU 201a, an interval between operations of rewriting image data in a pixel in displaying a still image is set by the arithmetic circuit 211f with the use of the value counted by the counting circuit 211c in each period set in accordance with the pulse of the operation signal input from the outside.

A start signal SP, a clock signal CK, and power supply voltage Vp are input to the display control circuit 201b. Moreover, the control signal GDCTL and the control signal SDCTL are input to the display control circuit 201b from the CPU 201a. The display control circuit 201b has a function of controlling timing when the input signals or voltage is supplied to the scan signal line driver circuit 201c or the image signal line driver circuit 201d by outputting the input signals or the voltage at a timing depending on voltage of the control signal GDCTL and voltage of the control signal SDCTL. The start signal SP input to the scan signal line driver circuit 201c is also referred to as a start signal GSP. The start signal SP input to the image signal line driver circuit 201d is also referred to as a start signal SSP. The clock signal CK input to the scan signal line driver circuit 201c is also referred to as a clock signal GCK. The clock signal CK input to the image signal line driver circuit 201d is also referred to as a clock signal SCK. The power supply voltage Vp input to the scan signal line driver circuit 201c is also referred to as power supply voltage GVp. The power supply voltage Vp which is input to the image signal line driver circuit 201d is also referred to as power supply voltage SVp.

Note that the start signal GSP is a pulse signal corresponding to the vertical synchronization frequency, and the start signal SSP is a pulse signal corresponding to a gate selection period.

Further, the clock signal GCK is not limited to one clock signal and a plurality of clock signals having phases different from each other may be used as the clock signal GCK. When a plurality of clock signals is used as the clock signal GCK, operation speed of the scan signal line driver circuit 201c can be improved. Further, the clock signal SCK is not limited to one clock signal and a plurality of clock signals having phases different from each other may be used as the clock signal SCK. When a plurality of clock signals having phases different from each other is used as the clock signal SCK, operation speed of the image signal line driver circuit 201d can be improved. Note that a common clock signal may be used as the clock signal GCK and the clock signal SCK.

Common power supply voltage may be used as the power supply voltage GVp and the power supply voltage SVp.

The scan signal line driver circuit 201c has a function of outputting the scan signal SCN to x (x is a natural number) scan signal lines. The scan signal line driver circuit 201c outputs the scan signal SCN to the pixel through the scan signal line 203_g (g is a natural number greater than or equal to 1 and less than or equal to x) to select a pixel to which the image signal IMG is input.

The image signal line driver circuit 201d has a function of outputting the image signal IMG to y (y is a natural number) image signal lines. The image signal line driver circuit 201d outputs the image signal IMG to the pixel selected by the scan signal line driver circuit 201c through the image signal line 204_s (s is a natural number greater than or equal to 1 and less than or equal to y).

The pixel portion 202 includes n pixels, which are arranged in a matrix with x rows and y columns.

The pixel 202_k includes a transistor 221_k, a liquid crystal element 222_k, and a capacitor 223_k.

A first terminal of the transistor 221_k is electrically connected to the image signal line 204_s and a third terminal of the transistor 221_k is electrically connected to the scan signal line 203_g.

As the transistor 221_k, for example, as described in the above embodiment, a transistor having small off-state current can be used. In the transistor, the off-state current per micrometer of channel width is smaller than or equal to 10 aA ($1\times10^{-17}$ A), preferably smaller than or equal to 1 aA ($1\times10^{-18}$ A), more preferably smaller than or equal to 10 zA ($1\times10^{-20}$ A), and still more preferably smaller than or equal to 1 zA ($1\times10^{-21}$ A).

With the use of the transistor having small off-state current as the transistor 221_k, variations in voltage applied to the liquid crystal element 222_k, which are caused by off-state current of the transistor 221_k, can be suppressed. Therefore, a period for displaying an image corresponding to one writing of image data can be made longer, and an interval between operations of writing image data can be made longer. For example, the interval between the operations of writing image data can be 10 seconds or longer, preferably 30 seconds or longer, more preferably 1 minute or longer. As the interval between the operations of writing image data is made longer, power consumption can be further reduced.

As the transistor having small off-state current, for example, a transistor including an oxide semiconductor layer serving as a channel formation layer can be used. The oxide semiconductor layer serving as a channel formation layer is an intrinsic (also referred to as i-type) or substantially intrinsic semiconductor layer.

The liquid crystal element 222_k has a first terminal and a second terminal. The first terminal of the liquid crystal element 222_k is electrically connected to a second terminal of the transistor 221_k.

The liquid crystal element 222_k can include a pixel electrode which functions as part of or the whole of the first terminal, a common electrode which functions as part of or the whole of the second terminal, and a liquid crystal layer whose transmittance is changed in accordance with voltage applied between the pixel electrode and the common electrode.

The specific resistivity of a liquid crystal material used for the liquid crystal layer in the liquid crystal element 222_k is $1\times10^{12}$ Ω·cm or more, preferably $1\times10^{13}$ Ω·cm or more, and more preferably $1\times10^{14}$ Ω·cm or more at 20° C., for example. In the case where a liquid crystal element is formed using the above liquid crystal material, the resistivity of a portion serving as the liquid crystal element may be $1\times10^{11}$ Ω·cm or more, or further $1\times10^{12}$ Ω·cm or more in some cases because of an impurity mixed into a liquid crystal layer from an alignment film, a sealant, or the like.

As the specific resistivity of a liquid crystal material is larger, leakage current flowing through a liquid crystal layer is reduced, whereby variations in voltage applied to the liquid crystal element 222_k, which are caused by leakage current flowing through the liquid crystal layer, can be suppressed. As a result, the display period of the pixel 202_k, which corresponds to one-time writing of the image data, can be made longer, so that the frequency of writing of the image data in the pixel 202_k can be decreased, and power consumption of the display device can be reduced.

The capacitor 223_k has a first terminal and a second terminal. The first terminal of the capacitor 223_k is electrically connected to the second terminal of the transistor 221_k. The capacitor 223_k has a function of a storage capacitor and includes a first electrode serving as part of or the whole of the first terminal, a second electrode serving as part of or the whole of the second terminal, and a dielectric layer. The capacitance of the capacitor 223_k may be set in consideration of the off-state current of the transistor 221_k or the like. For example, the capacitance of the capacitor 223_k may be ⅓ or less, preferably ⅕ or less of the capacitance of the liquid crystal element 222_k in the pixel 202_k (also referred to as liquid crystal capacitance). Further, the capacitor 223_k is not necessarily provided depending on the value of the off-state current of the transistor 221_k. A structure in which the capacitor 223_k is not provided may be employed. Omission of the capacitor 223_k in the pixel 202_k can improve the aperture ratio of the pixel.

When the transistor 221_k is turned on in accordance with voltage of the scan signal SCN input through the scan signal line 203_g, the image signal IMG is input to the pixel 202_k through the image signal line 204_s. Further, when voltage depending on the input image signal IMG is applied between the first terminal and the second terminal of the liquid crystal element 222_k, the pixel 202_k is in a display state.

Note that an optical detection circuit (also referred to as a photosensor) can be provided in the pixel 202_k. With the optical detection circuit, the pixel 202_k can detect all object to be detected by optical detection and the display device of this embodiment can function as a touch panel.

Further, as illustrated in FIG. 2, a transistor 205 and a light source portion (also referred to as LS) 206 can be provided for the display device of this embodiment.

Voltage Vcom (also referred to as common voltage Vcom) is input to a first terminal of the transistor 205. A second terminal of the transistor 205 is electrically connected to the second terminal of the liquid crystal element 222_k and the second terminal of the capacitor 223_k in the pixel 202_k. A control signal $CTL_{205}$ is input to a third terminal of the transistor 205. The voltage Vcom is voltage set in accordance with the voltage of the image signal IMG. The transistor 205 has a function of controlling whether to set the voltage of the second terminal of the liquid crystal element 222_k and the voltage of the second terminal of the capacitor 223_k to the voltage Vcom by being turned on or off in accordance with the voltage of the control signal $CTL_{205}$. Note that the transistor 205 is formed over the same substrate as the pixel portion 202, for example. Alternatively, the transistor 205 may be formed over a substrate different from a substrate over which the pixel portion 202 is formed. Although the transistor 205 is not necessarily provided, variations in the voltage applied to the liquid crystal element 222_k, which are caused by noise, can be suppressed with the transistor 205.

The light source portion 206 has a function of supplying light to the pixel portion 202. As the light source portion 206, a backlight, a sidelight, a front light, or the like can be used. The light source portion 206 is constituted by a light source and a light source control circuit for controlling operation of the light source, for example. As the light source, for example, a light source including three primary colors of light can be used. Alternatively, a light-emitting element (e.g., an LED) that emits white light can be used as the light source, for example. The display device of this embodiment may have a structure in which a lighting state of the light source portion 206 is controlled by the display control circuit 201b. The light source portion 206 is controlled by the display control circuit 201b, whereby the light source can be turned off as necessary and power consumption can be reduced.

Next, as an example of a method for driving the display device of this embodiment, an example of a method for driving the display device illustrated in FIG. 2 will be described.

First, operation of the CPU 201a will be described.

In the CPU 201a, an operation signal which has a predetermined signal system is input through the interface 211a.

The counting circuit 211c counts the number of pulses of the reference clock signal RCK input from the reference clock signal generation circuit 211b in each period set in accordance with the pulse of the input operation signal. Further, data of the counted value in each period, which is obtained by counting, is stored in the latch circuit 211d as a signal for a certain period and then is output to the arithmetic circuit 211f. When the pulse of the operation signal is input to the counting circuit 211c, the counted value of the counting circuit 211c is reset. Data of the counted value of an initial state is stored in the latch circuit 211d as a signal for a certain period, and is output to the arithmetic circuit 211f. Each period corresponds to an interval between pulses of the operation signal, for example.

The arithmetic circuit 211f reads the data of a rewriting interval in displaying a still image, which corresponds to the data signal of the input counted value, from the memory circuit 211e, generates the control signal GDCTL and the control signal SDCTL with the use of the read data, and outputs the generated control signal GDCTL and the generated control signal SDCTL to the display control circuit 201b through the output circuit 211g. At this time, it is preferable that data of the counted value correspond to data of a rewriting interval in displaying a still image so that a rewriting interval in displaying a still image is longer as the counted value is larger.

Figure 3A:
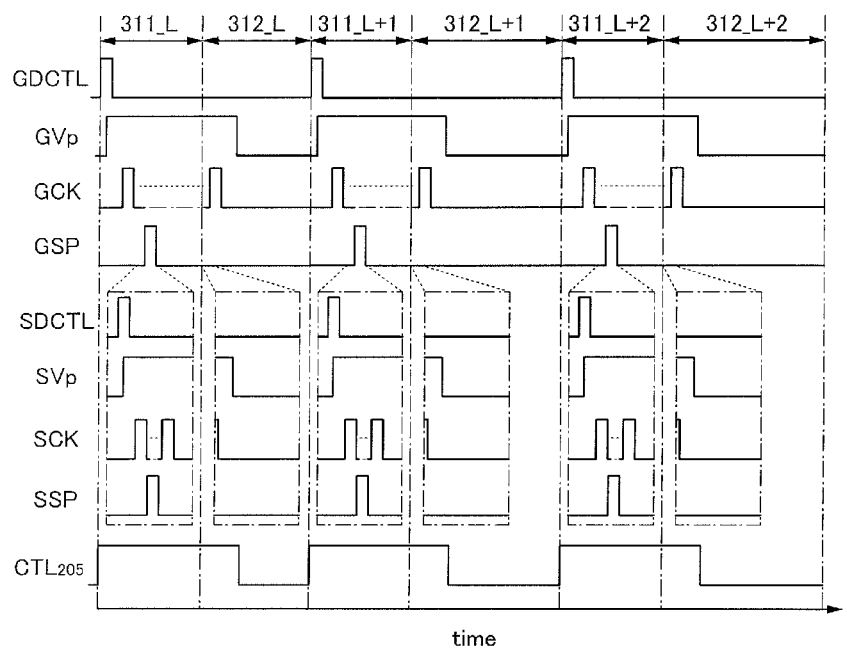
FIGS. 3A and 3B are charts showing a method for driving the display device illustrated in FIG. 2.
Figure 3B:
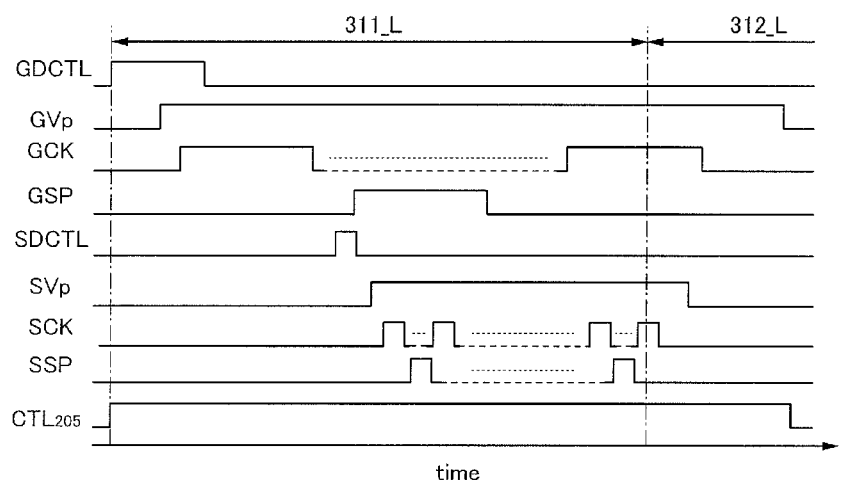

Further, an example of a method for driving the display device illustrated in FIG. 2 will be described with reference to FIGS. 3A and 3B. FIGS. 3A and 3B are charts showing an example of a method for driving the display device illustrated in FIG. 2. In FIGS. 3A and 3B, shown are waveforms of the control signal GDCTL, the power supply voltage GVp, the clock signal GCK, the start signal GSP, the control signal SDCTL, the power supply voltage SVp, the clock signal SCK, the start signal SSP, and the control signal $CTL_{205}$. Note that FIG. 3B is an enlarged view of part of the period in FIG. 3A. Note that here, as an example, the power supply voltage GVp and the power supply voltage SVp are a common power supply voltage, the clock signal GCK is one clock signal, the clock signal SCK is one clock signal, and the control signal GDCTL, the control signal SDCTL, the start signal GSP, and the start signal SSP are all binary digital signals.

In an example of the method for driving the display device illustrated in FIG. 2, there are a period for displaying a moving image and a period for displaying a still image. In the period for displaying a still image, operation in a period 311 and operation in a period 312 are sequentially performed N times. The period 311 is a frame period for displaying a moving image and the period 312 is a frame period for displaying a still image.

First, in an L-th period 311_L (L is a natural number), the display control circuit 201b starts output of the power supply voltage GVp, the start signal GSP, and the clock signal GCK (also referred to as first output start operation) when the pulse of the control signal GDCTL is input. In the first output start operation, output of the power supply voltage GVp is started first. After that, when the output of the power supply voltage GVp is stabilized, output of the clock signal GCK is started and then output of the start signal GSP is started. Note that start operation of output of the clock signal GCK is preferably performed in such a manner that before output of the clock signal GCK, voltage equivalent to voltage of the clock signal GCK at high level is applied to a wiring to which the clock signal GCK is input, and the clock signal GCK is output after the voltage of the wiring to which the clock signal GCK is input is stabilized. The first output start operation is performed in the above manner, so that malfunction of the scan signal line driver circuit 201c in starting operation can be suppressed.

Further, in the L-th period 311_L, the display control circuit 201b starts output of the power supply voltage SVp, the start signal SSP, and the clock signal SCK (also referred to as second output start operation) when the pulse of the control signal SDCTL is input. In the second output start operation, output of the power supply voltage SVp is started first. After that, when the output of the power supply voltage SVp is stabilized, output of the clock signal SCK is started and then output of the start signal SSP is started. Note that start operation of output of the clock signal SCK is preferably performed in such a manner that before output of the clock signal SCK, voltage equivalent to voltage of the clock signal SCK at high level is applied to a wiring to which the clock signal SCK is input, and the clock signal SCK is output after the voltage of the wiring to which the clock signal SCK is input is stabilized. The second output start operation is performed in the above manner, so that malfunction of the image signal line driver circuit 201d in starting operation can be suppressed.

At this time, the scan signal line driver circuit 201c outputs the scan signal SCN through the scan signal line 203_g and sequentially selects the pixels 202_k to which the image signal IMG is input, in accordance with the scan signal SCN. The image signal line driver circuit 201d outputs the image signal IMG through the image signal line 204_s and sequentially outputs the image signal IMG to the pixels 202_k selected by the scan signal line driver circuit 201c. Further, the transistor 205 is turned on in accordance with the control signal $CTL_{205}$ input from the display control circuit 201b, so that the voltage Vcom is input to the pixel 202_k.

In the selected pixel 202_k, when the transistor 221_k is turned on, voltage of the first terminal of the liquid crystal element 222_k is equivalent to the voltage of the image signal IMG, voltage of the second terminal of the liquid crystal element 222_k is equivalent to the voltage Vcom, and light transmittance of the liquid crystal element 222_k is set in accordance with voltage applied between the first terminal and the second terminal of the liquid crystal element 222_k. Thus, the data of the image signal IMG is written to the selected pixel 202_k and a display state of the selected pixel 202_k is set. When the data of the image signal IMG is written to the selected pixel 202_k, the transistor 221_k is turned off and the voltage applied between the first terminal and the second terminal of the liquid crystal element 222_k is held for a certain period. The same operation is performed on the other pixels, whereby display states of all pixels are set; thus, an image is displayed in the pixel portion.

Next, in an L-th period 312_L, the display control circuit 201b stops output of the power supply voltage GVp, the start signal GSP, and the clock signal GCK (also referred to as first output stop operation). In the first output stop operation, output of the start signal GSP is stopped first, and output of the power supply voltage GVp is stopped after selection operation of the scan signal line 203_g is completed. Note that "to stop output" means, for example, to make a wiring to which a signal or voltage is input into a floating state, or to input voltage equivalent to value of a signal at low level to a wiring to which a signal or voltage is input, for example. The first output stop operation is performed in the above manner, whereby malfunction of the scan signal line driver circuit 201c in stopping operation can be reduced. Further, at this time, a pulse of the control signal GDCTL may be output to the display control circuit 201b.

Further, in the L-th period 312_L, the display control circuit 201b stops output of the power supply voltage SVp, the start signal SSP, and the clock signal SCK (also referred to as second output stop operation). In the second output stop operation, output of the start signal SSP is stopped first, and output of the power supply voltage SVp is stopped after selection operation of the image signal line 204_s is completed. The second output stop operation is performed in the above manner, whereby malfunction of the image signal line driver circuit 201d in stopping operation can be suppressed. Further, at this time, a pulse of the control signal SDCTL may be output to the display control circuit 201b.

At this time, operation of the scan signal line driver circuit 201c is stopped and output of the scan signal SCN is stopped. Operation of the image signal line driver circuit 201d is stopped and output of the image signal IMG is stopped. Further, the transistor 205 is turned off in accordance with the control signal $CTL_{205}$ input from the display control circuit 201b.

Further, at this time, in the pixel 202_k, the second terminal of the liquid crystal element 222_k is in a floating state, and the pixel 202_k keeps a display state based on the data of the image signal IMG written in the L-th period 311_L. Thus, in the L-th period 312_L, the pixel 202_k holds an image based on the data of the image signal IMG written in the L-th period 311_L as a still image for a certain period. At this time, the length of a period for holding the image based on the data of the image signal IMG is controlled by, for example, pulse intervals of the control signal GDCTL and the control signal SDCTL output from the CPU 201a.

Next, in a (L+1)-th period 311_L+1, the display control circuit 201b performs the first output start operation and the second output start operation again.

At this time, the scan signal line driver circuit 201c outputs the scan signal SCN through the scan signal line 203_g and sequentially selects the pixels 202_k to which the image signal IMG is input, in accordance with the scan signal SCN. The image signal line driver circuit 201d outputs the image signal IMG through the image signal line 204_s and sequentially outputs the image signal IMG to the pixels 202_k selected by the scan signal line driver circuit 201c. Further, the transistor 205 is turned on in accordance with the control signal $CTL_{205}$ input from the display control circuit 201b, so that the voltage Vcom is input to the pixel 202_k.

In the selected pixel 202_k, when the transistor 221_k is turned on, voltage of the first terminal of the liquid crystal element 222_k is equivalent to the voltage of the image signal IMG, voltage of the second terminal of the liquid crystal element 222_k is equivalent to the voltage Vcom, and light transmittance of the liquid crystal element 222_k is set in accordance with voltage applied between the first terminal and the second terminal of the liquid crystal element 222_k. Thus, the data of the image signal IMG is written to the selected pixel 202_k and a display state of the selected pixel 202_k is set. When the data of the image signal IMG is written to the selected pixel 202_k, the transistor 221_k is turned off and the voltage applied between the first terminal and the second terminal of the liquid crystal element 222_k is held for a certain period. The same operation is performed on the other pixels, whereby display states of all pixels are set; thus, an image is displayed in the pixel portion.

Next, in a (L+1)-th period 312_L+1, the display control circuit 201b performs the first output stop operation and the second output stop operation again. Note that a period in which output of the start signal SSP, the clock signal SCK, and the power supply voltage SVp is stopped in the (L+1)-th period 312_L+1 is set longer than a period in which output of the start signal SSP, the clock signal SCK, and the power supply voltage SVp is stopped in the L-th period 312_L.

At this time, operation of the scan signal line driver circuit 201c is stopped and output of the scan signal SCN through the scan signal line 203_g is stopped. Further, operation of the image signal line driver circuit 201d is stopped and output of the image signal IMG through the image signal line 204_s is stopped. Note that a period in which output of the start signal GSP, the clock signal GCK, and the power supply voltage GVp is stopped in the (L+1)-th period 312_L+1 is set longer than a period in which output of the start signal GSP, the clock signal GCK, and the power supply voltage GVp is stopped in the L-th period 312_L. The transistor 205 is turned off in accordance with the control signal $CTL_{205}$ input from the display control circuit 201b.

Further, at this time, in the pixel 202_k, the second terminal of the liquid crystal element 222_k is in a floating state and the pixel 202_k keeps a display state based on the data of the image signal IMG written in the (L+1)-th period 311_L+1. Thus, in the (L+1)-th period 312_L+1, the pixel 202_k holds an image based on the data of the image signal IMG written in the (L+1)-th period 311_L+1 as a still image for a certain period. A period in which the image based on the data of the image signal IMG is held in the (L+1)-th period 312_L+1 is longer than a period in which the image based on the data of the image signal IMG is held in the L-th period 312_L in accordance with the length of the period in which output of the start signal SSP, the clock signal SCK, and the power supply voltage SVp is stopped in the (L+1)-th period 312_L+1.

Further, when N is 3 or more, for example, in a (L+2)-th period 311_L+2, the display control circuit 201b performs the first output start operation and the second output start operation again.

At this time, the scan signal line driver circuit 201c outputs the scan signal SCN through the scan signal line 203_g and sequentially selects the pixels 202_k to which the image signal IMG is input, in accordance with the scan signal SCN. The image signal line driver circuit 201d outputs the image signal IMG through the image signal line 204_s and sequentially outputs the image signal IMG to the pixels 202_k selected by the scan signal line driver circuit 201c. Further, the transistor 205 is turned on in accordance with the control signal $CTL_{205}$ input from the display control circuit 201b, so that the voltage Vcom is input to the pixel 202_k.

In the selected pixel 202_k, when the transistor 221_k is turned on, voltage of the first terminal of the liquid crystal element 222_k is equivalent to the voltage of the image signal IMG, voltage of the second terminal of the liquid crystal element 222_k is equivalent to the voltage Vcom, and light transmittance of the liquid crystal element 222_k is set in accordance with voltage applied between the first terminal and the second terminal of the liquid crystal element 222_k. Thus, the data of the image signal IMG is written to the selected pixel 202_k and a display state of the selected pixel 202_k is set. When the data of the image signal IMG is written to the selected pixel 202_k, the transistor 221_k is turned off and the voltage applied between the first terminal and the second terminal of the liquid crystal element 222_k is held for a certain period. The same operation is performed on the other pixels, whereby display states of all pixels are set; thus, an image is displayed in the pixel portion.

Next, in a (L+2)-th period 312_L+2, the display control circuit 201b performs the first output stop operation and the second output stop operation again. Note that a period in which output of the start signal SSP, the clock signal SCK, and the power supply voltage SVp is stopped in the (L+2)-th period 312_L+2 is set longer than the period in which output of the start signal SSP, the clock signal SCK, and the power supply voltage SVp is stopped in the (L+)-th period 312_L+1.

At this time, operation of the scan signal line driver circuit 201c is stopped and output of the scan signal SCN is stopped. Further, operation of the image signal line driver circuit 201d is stopped and output of the image signal IMG through the image signal line 204_s is stopped. Note that a period in which output of the start signal GSP, the clock signal GCK, and the power supply voltage GVp is stopped in the (L+2)-th period 312_L+2 is set longer than the period in which output of the start signal GSP, the clock signal GCK, and the power supply voltage GVp is stopped in the L+1-th period 312_(L+1). The transistor 205 is turned off in accordance with the control signal $CTL_{205}$ input from the display control circuit 201b.

Further, at this time, in the pixel 202_k, the second terminal of the liquid crystal element 222_k is in a floating state and the pixel 202_k keeps a display state based on the data of the image signal IMG written in the (L+2)-th period 311_L+2. Thus, in the (L+2)-th period 312_L+2, without additional application of voltage between the first terminal and the second terminal of the liquid crystal element 222_k, the pixel 202_k holds an image based on the data of the image signal IMG written in the (L+2)-th period 311_L+2 as a still image for a certain period. At this time, a period in which the image based on the data of the image signal IMG is held in the (L+2)-th period 312_L+2 is longer than the period in which the image based on the data of the image signal IMG is held in the (L+1)-th period 312_L+1 in accordance with the length of the period in which output of the start signal GSP, the clock signal GCK, and the power supply voltage GVp is stopped in the (L+2)-th period 312_L+2.

Further, for example, in the case where a pulse of an operation signal is input in the (L+1)-th period 312_L+1 or in the (L+2)-th period 312_L+2, the data of the counted value generated by the counting circuit 211c is reset and the display control circuit 201b performs the first output start operation and the second output start operation again.

At this time, the scan signal line driver circuit 201c outputs the scan signal SCN through the scan signal line 203_g and sequentially selects the pixels 202_k to which the image signal IMG is input, in accordance with the scan signal SCN. The image signal line driver circuit 201d outputs the image signal IMG through the image signal line 204_s and sequentially outputs the image signal IMG to the pixels 202_k selected by the scan signal line driver circuit 201c. Further, the transistor 205 is turned on in accordance with the control signal $CTL_{205}$ input from the display control circuit 201b, so that the voltage Vcom is input to the pixel 202_k.

In the selected pixel 202_k, when the transistor 221_k is turned on, voltage of the first terminal of the liquid crystal element 222_k is equivalent to the voltage of the image signal IMG, voltage of the second terminal of the liquid crystal element 222_k is equivalent to the voltage Vcom, and light transmittance of the liquid crystal element 222_k is set in accordance with voltage applied between the first terminal and the second terminal of the liquid crystal element 222_k. Thus, the data of the image signal IMG is written to the selected pixel 202_k and a display state of the selected pixel 202_k is set. When the data of the image signal IMG is written to the selected pixel 202_k, the transistor 221_k is turned off and the voltage applied between the first terminal and the second terminal of the liquid crystal element 222_k is held for a certain period. The same operation is performed on the other pixels, whereby display states of all pixels are set; thus, an image is displayed in the pixel portion.

As described in the above example, an example of the display device of this embodiment has a structure in which output of a start signal, a clock signal, and power supply voltage to a driver circuit is stopped in displaying a still image and a displayed image is held in a pixel portion for a certain period. Accordingly, power consumption can be reduced.

Further, an example of the display device of this embodiment has a structure in which a transistor having small off-state current is used as a transistor for controlling whether an image signal is input to a liquid crystal element. Accordingly, variations in voltage applied to the liquid crystal element, which are caused by off-state current of the transistor, can be suppressed and thus, a period in which a driver circuit stops operation can be set long and power consumption can be reduced. Thus, an interval between operations of writing image data can be shortened, and eye fatigue caused by change of images can be alleviated.

Further, an example of the display device of this embodiment has a structure in which, when N is 2 or more, a K-th stop period of a driver circuit in displaying a still image is longer than a (K−1)-th stop period of the driver circuit in displaying a still image. With the structure, for example, in the case where input operation by an external device is not performed (e.g., the case where a pulse of an operation signal is not input by a pointing device), a stop period of the drive circuit can be changed to be longer, so that power consumed when any of pulses of operation signals is not input from an external device can be further reduced.

Further, in an example of the display device of this embodiment, a stop period of a driver circuit in displaying a still image is made longer every time an image signal in displaying a still image is rewritten. Moreover, in the case where input operation by an external device is performed, the image signal can be rewritten by driving the driver circuit again. Therefore, power consumption can be reduced without disturbing a user viewing a displayed image, with deterioration of an image, for example.

Note that this embodiment can be combined with or replaced by any of the other embodiments as appropriate.

Embodiment 3

In this embodiment, an example of a shift register which can be used in the scan signal line driver circuit and the image signal line driver circuit of the display device described in the above embodiments will be described.

Figure 4A:
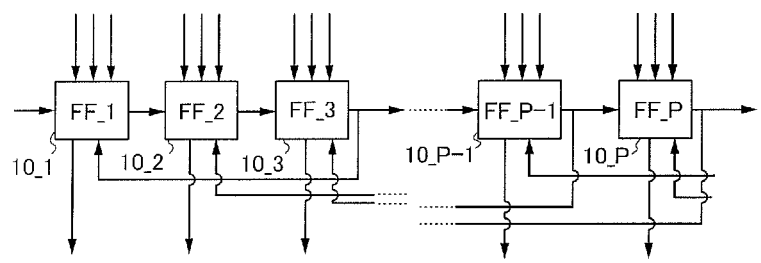
FIGS. 4A and 4B are diagrams illustrating an example of a structure of a shift register in Embodiment 3.
Figure 4B:
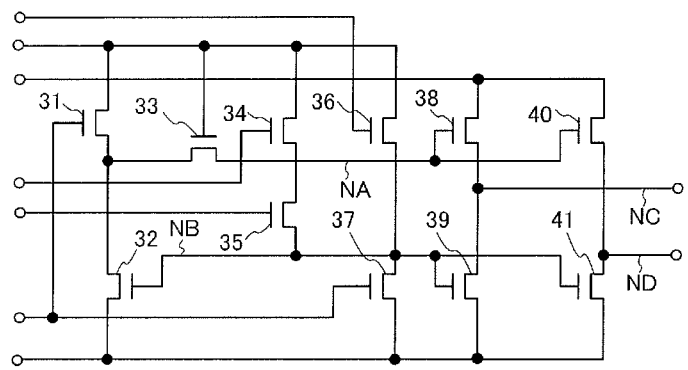

An example of the structure of the shift register of this embodiment will be described with reference to FIGS. 4A and 4B. FIGS. 4A and 4B are diagrams illustrating an example of the structure of the shift register of this embodiment.

The shift register illustrated in FIG. 4A includes unit sequential circuits of P stages, which includes P (P is a natural number of 3 or more) unit sequential circuits (unit sequential circuits 10_1 (also referred to as FF_1) to 10_P (also referred to as FF_P)).

A start signal and a reset signal are input to each of the unit sequential circuits 10_1 to 10_P.

Further, a clock signal CK1, a clock signal CK2, and a clock signal CK3 are input to each of the unit sequential circuits 10_1 to 10_P. As the clock signal CK1, the clock signal CK2, and the clock signal CK3, for example, any three of a first clock signal (also referred to as CLK1), a second clock signal (also referred to as CLK2), a third clock signal (also referred to as CLK3), and a fourth clock signal (also referred to as CLK4) can be used. The first to fourth clock signals are digital signals whose level is repeatedly switched between high level and low level. Note that the same combination of the clock signals is not input to the two adjacent unit sequential circuits. The shift register illustrated in FIG. 4A controls operation of the unit sequential circuits with the first to fourth click signals. Thus, operation speed can be improved.

An example of a circuit structure of the unit sequential circuit illustrated in FIG. 4A will be described with reference to FIG. 4B. FIG. 4B is a circuit diagram illustrating an example of the circuit structure of the unit sequential circuit illustrated in FIG. 4A.

The unit sequential circuit illustrated in FIG. 4B includes a transistor 31, a transistor 32, a transistor 33, a transistor 34, a transistor 35, a transistor 36, a transistor 37, a transistor 38, a transistor 39, a transistor 40, and a transistor 41.

Voltage Va is input to a first terminal of the transistor 31 and a signal to be a start signal of the unit sequential circuit is input to a third terminal of the transistor 31.

Voltage Vb is input to a first terminal of the transistor 32 and a second terminal of the transistor 32 is electrically connected to a second terminal of the transistor 31.

Note that one of the voltage Va and the voltage Vb is to be high power supply voltage Vdd and the other is to be low power supply voltage Vss. The high power supply voltage Vdd is relatively higher than the low power supply voltage Vss, and the low power supply voltage Vss is relatively lower than the high power supply voltage Vdd. Values of the voltage Va and the voltage Vb interchanges depending on polarity of a transistor or the like in some cases. A potential difference between the voltage Va and the voltage Vb is power supply voltage.

A first terminal of the transistor 33 is electrically connected to the second terminal of the transistor 31 and the voltage Va is input to a third terminal of the transistor 33.

The voltage Va is input to a first terminal of the transistor 34 and a signal to be the clock signal CK1 of the unit sequential circuit is input to a third terminal of the transistor 34.

A first terminal of the transistor 35 is electrically connected to a second terminal of the transistor 34, a second terminal of the transistor 35 is electrically connected to a third terminal of the transistor 32, and a signal to be the clock signal CK2 of the unit sequential circuit is input to a third terminal of the transistor 35.

The voltage Va is input to a first terminal of the transistor 36 and a signal to be the reset signal of the unit sequential circuit is input to a third terminal of the transistor 36.

The voltage Vb is input to a first terminal of the transistor 37, a second terminal of the transistor 37 is electrically connected to the third terminal of the transistor 32 and a second terminal of the transistor 36, and the signal to be the start signal of the unit sequential circuit is input to a third terminal of the transistor 37.

A signal to be the clock signal CK3 of the unit sequential circuit is input to a first terminal of the transistor 38 and a third terminal of the transistor 38 is electrically connected to a second terminal of the transistor 33.

The voltage Vb is input to a first terminal of the transistor 39, a second terminal of the transistor 39 is electrically connected to a second terminal of the transistor 38, and a third terminal of the transistor 39 is electrically connected to the third terminal of the transistor 32.

The signal to be the clock signal CK3 of the unit sequential circuit is input to a first terminal of the transistor 40 and a third terminal of the transistor 40 is electrically connected to the second terminal of the transistor 33.

The voltage Vb is input to a first terminal of the transistor 41, a second terminal of the transistor 41 is electrically connected to a second terminal of the transistor 40, and a third terminal of the transistor 41 is electrically connected to the third terminal of the transistor 32.

Note that in FIG. 4B, a point at which the second terminal of the transistor 33, the third terminal of the transistor 38, and the third terminal of the transistor 40 are connected is a node NA. A point at which the third terminal of the transistor 32, the second terminal of the transistor 35, the second terminal of the transistor 36, the second terminal of the transistor 37, the third terminal of the transistor 39, and the third terminal of the transistor 41 are connected is a node NB. A point at which the second terminal of the transistor 38 and the second terminal of the transistor 39 are connected is a node NC. A point at which the second terminal of the transistor 40 and the second terminal of the transistor 41 are connected is a node ND.

The unit sequential circuit illustrated in FIG. 4B outputs voltage of the node NC as a first output signal (also referred to as OUT1) and outputs voltage of the node ND as a second output signal (also referred to as OUT2). In the display device of the above embodiments, for example, the second output signal is used as the scan signal SCN for selecting a pixel or a signal for outputting the image signal IMG to the selected pixel.

In the unit sequential circuits 10_1 to 10_P, for example, as a start signal, the start signal GSP, the start signal SSP, or the like in the display device of the above embodiments is input to the third terminal of the transistor 31 and the third terminal of the transistor 37 in the unit sequential circuit 10_1 of the first stage.

In the unit sequential circuits 10_1 to 10_P, the third terminal of the transistor 31 and the third terminal of the transistor 37 in the unit sequential circuit 10_Q+2 of the (Q+2)-th stage (Q is a natural number greater than or equal to 1 and less than or equal to (P−2)) are electrically connected to the second terminal of the transistor 38 in the unit sequential circuit 10_Q+1 of the (Q+1)-th stage, and the first output signal of the unit sequential circuit 10_Q+1 is the start signal of the unit sequential circuit 10_Q+2.

In the unit sequential circuits 10_1 to 10_P, the second terminal of the transistor 38 in the unit sequential circuit 10_U of the U-th stage (U is a natural number greater than or equal to 3 and less than or equal to P) is electrically connected to the third terminal of the transistor 36 in the unit sequential circuit 10_U−2 of the (U−2)-th stage, and the first output signal of the unit sequential circuit 10_U is the reset signal of the unit sequential circuit 10_U−2.

In the unit sequential circuits 10_1 to 10_P, a signal S51 is input as a reset signal to the third terminal of the transistor 36 in the unit sequential circuit 10_P−1 of the (P−1)-th stage. As the signal S51, a signal which is generated separately can be used, for example. Note that the unit sequential circuit 10_P−1 of the (P−1)-th stage is used as a dummy unit sequential circuit.

In the unit sequential circuits 10_1 to 10_P, a signal S52 is input as a reset signal to the third terminal of the transistor 36 in the unit sequential circuit 10_P of the P-th stage. As the signal S52, a signal which is generated separately can be used, for example. Note that the unit sequential circuit 10_P of the P-th stage is used as a dummy unit sequential circuit.

The transistors 31 to 41 can have the same conductivity.

Figure 5A:
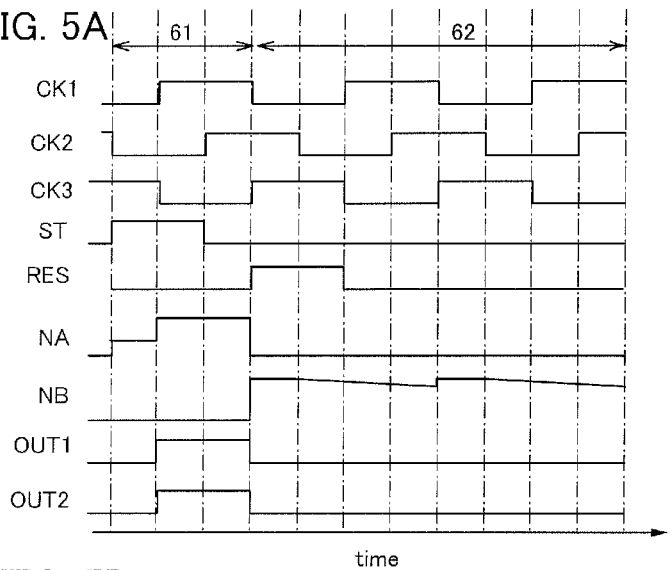
FIGS. 5A and 5B are charts showing an example of operation of the shift register illustrated in FIGS. 4A and 4B.
Figure 5B:
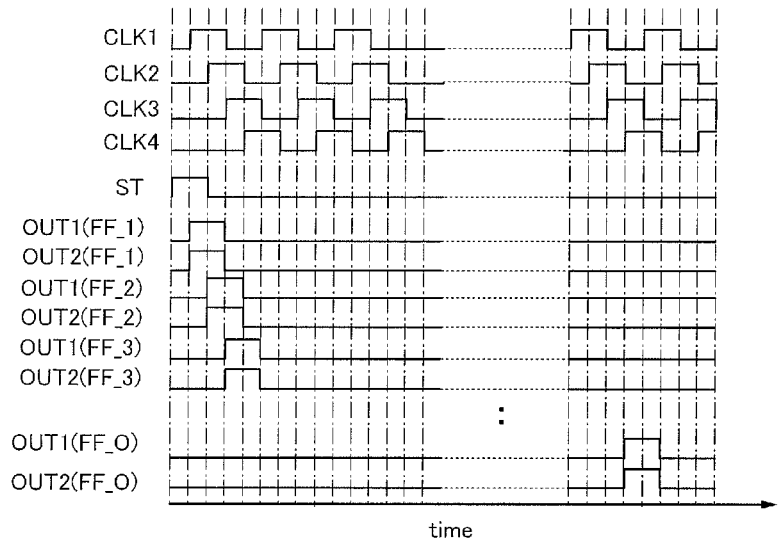

Next, an example of operation of the shift register illustrated in FIG. 4A will be described with reference to FIGS. 5A and 5B. FIGS. 5A and 5B are timing charts showing an example of operation of the shift register illustrated in FIG. 4A. FIG. 5A is a timing chart showing an example of operation of the unit sequential circuit illustrated in FIG. 4B and FIG. 5B is a timing chart showing an example of operation of the shift register illustrated in FIG. 4A. Note that here, as an example, each of the unit sequential circuits 10_1 to 10_P illustrated in FIG. 4A has a structure illustrated in FIG. 4B. Further, as an example, all the transistors 31 to 41 of the unit sequential circuit illustrated in FIG. 4B have N-type conductivity, the high power supply voltage Vdd is input as the voltage Va, and the low power supply voltage Vss is input as the voltage Vb.

As illustrated in FIG. 5A, in each of the unit sequential circuits 10_1 to 10_P, in a selection period 61, a pulse of the start signal ST is input, the voltage of the node NA increases to the high power supply voltage Vdd or higher, the transistor 38 and the transistor 40 are turned on, the voltage of the node NB is at low level, and the transistor 39 and the transistor 41 are turned off; thus, the first output signal becomes high level and the second output signal becomes high level. In a non-selection period 62, by inputting a pulse of the reset signal, the voltage of the node NA becomes low level, the transistor 38 and the transistor 40 are turned off, the voltage of the node NB becomes high level, and the transistor 39 and the transistor 41 are turned on; thus, the first output signal and the second output signal are kept at low level. Accordingly, each of the unit sequential circuits 10_1 to 10_P outputs a pulse of the first output signal and a pulse of the second output signal.

Further, as illustrated in FIG. 5B, the above operation is sequentially performed in each of the unit sequential circuits in accordance with the first to fourth clock signals, so that the unit sequential circuits 10_1 to 10_P sequentially outputs the pulse of the first output signal and the pulse of the second output signal.

As illustrated in FIGS. 4A and 4B and FIGS. 5A and 5B, the shrift register of this embodiment has a structure in which each of the unit sequential circuits outputs pulses of output signals.

For example, by using the shift register of this embodiment for the scan signal line driver circuit of the display device of the above embodiments, a scan signal can be generated using output signals of each of the unit sequential circuits.

Further, when the shift register of this embodiment is used for the image signal line driver circuit of the display device of the above embodiments, for example, an image signal can be output to a pixel with the use of output signals of each of the unit sequential circuits.

When the shift register of this embodiment is used for the scan signal line driver circuit and the image signal line driver circuit of the display device of the above embodiments, voltages input to each of the unit sequential circuits are sequentially stopped and thus, operations of the scan signal line driver circuit and the image signal line driver circuit can be easily stopped.

Note that this embodiment can be combined with or replaced by any of the other embodiments as appropriate.

Embodiment 4

In this embodiment, an example of a transistor which can be used in the display device of the above embodiments will be described.

As the transistor which can be used in the display device of the above embodiments, a transistor including an oxide semiconductor layer serving as a channel formation layer can be used, for example. The oxide semiconductor layer of the transistor, which has a function of the channel formation layer, is highly purified to be an intrinsic (also referred to as an I-type) or substantially intrinsic semiconductor layer.

Note that high purification is a general idea including at least one of the following cases: the case where hydrogen in an oxide semiconductor layer is removed as much as possible; and the case where oxygen is supplied to an oxide semiconductor layer and defects due to oxygen deficiency of the oxide semiconductor layer are reduced.

As an oxide semiconductor which can be used for the oxide semiconductor layer, for example, a four-component metal oxide, a three-component metal oxide, or a two-component metal oxide can be given. As the four-component metal oxide, for example, an In—Sn—Ga—Zn—O-based metal oxide can be used. As the three-component metal oxide, for example, an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, or a Sn—Al—Zn—O-based metal oxide can be used. As the two-component metal oxide, for example, an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, or an In—Sn—O-based metal oxide can be used. In addition, an In—O-based metal oxide, a Sn—O-based metal oxide, a Zn—O-based metal oxide, or the like can also be used as the oxide semiconductor. The metal oxide that can be used as the oxide semiconductor may contain $SiO_2$.

Moreover, a material represented by $InMO_3(ZnO)_m$ (m is larger than 0) can be used as the oxide semiconductor. Here, M denotes one or more of metal elements selected from Ga, Al, Mn, and Co. For example, M can be Ga, Ga and Al, Ga and Mn, or Ga and Co.

Furthermore, the band gap of the oxide semiconductor is more than or equal to 2 eV, preferably more than or equal to 2.5 eV, and more preferably more than or equal to 3 eV, which reduces the number of carriers generated by thermal excitation to a negligible level. In addition, the amount of an impurity such as hydrogen which might serve as a donor is reduced to a certain amount or less so that the carrier concentration is less than $1\times10^{14}/cm^3$, preferably less than or equal to $1\times10^{12}/cm^3$. That is, the carrier concentration of the oxide semiconductor layer is reduced to zero or substantially zero.

In the aforementioned oxide semiconductor layer, the avalanche breakdown does not easily occur and the withstand voltage is high. For example, the band gap of silicon is as narrow as 1.12 eV; thus, electrons are easily generated like an avalanche owing to the avalanche breakdown, and the number of electrons which are accelerated to high speed so as to go over a barrier to a gate insulating layer is increased. In contrast, since the oxide semiconductor used for the aforementioned oxide semiconductor layer has a band gap of as wide as 2 eV or more, the avalanche breakdown does not easily occur and resistance to hot-carrier degradation is higher than that of silicon, and the withstand voltage is thus high.

The hot-carrier degradation means, for example, deterioration of transistor characteristics caused by fixed charge which is generated when highly-accelerated electrons are injected into a gate insulating layer in the vicinity of a drain in a channel; or deterioration of transistor characteristics caused by a trap level which is formed at the interface of a gate insulating layer by highly-accelerated electrons. The deterioration of transistor characteristics is, for example, variations in threshold voltage of a transistor or gate leakage current flowing through a gate of a transistor. The hot-carrier degradation is caused by channel-hot-electron injection (also referred to as CHE injection) or drain-avalanche-hot-carrier injection (also referred to as DAHC injection).

Note that the band gap of silicon carbide, which is one of materials having high withstand voltage, is substantially equal to that of an oxide semiconductor used for the oxide semiconductor layer, but electrons are less likely to be accelerated in an oxide semiconductor because the mobility of the oxide semiconductor is lower than that of silicon carbide by approximately two orders of magnitude. Further, a barrier between an oxide semiconductor and a gate insulating layer is larger than a barrier between silicon carbide, gallium nitride, or silicon and a gate insulating layer; therefore, the number of electrons injected into the gate insulating layer is extremely small, whereby hot-carrier degradation is less likely to be caused and withstand voltage is higher than in the case of silicon carbide, gallium nitride, or silicon. The oxide semiconductor has a high withstand voltage even in an amorphous state.

Furthermore, the transistor including the oxide semiconductor layer can have an off-state current per micrometer of channel width of 10 aA ($1\times10^{-17}$ A) or less, 1 aA ($1\times10^{-18}$ A) or less, 10 zA ($1\times10^{-20}$ A) or less, and further 1 zA ($1\times10^{-21}$ A) or less.

In the transistor including the above oxide semiconductor layer, degradation due to light (e.g., variations in the threshold voltage) is little.

An example of a structure of the transistor in this embodiment will be described with reference to FIGS. 6A to 6D. FIGS. 6A to 6D are cross-sectional schematic diagrams each illustrating an example of the structure of the transistor in this embodiment.

Figure 6A:
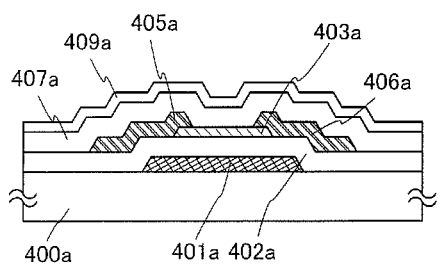
FIGS. 6A to 6D are cross-sectional schematic views illustrating examples of structures of transistors in Embodiment 4.

The transistor illustrated in FIG. 6A is one of bottom-gate transistors, which is also referred to as an inverted staggered transistor.

The transistor illustrated in FIG. 6A includes a conductive layer 401a serving as a gate electrode, an insulating layer 402a serving as a gate insulating layer, an oxide semiconductor layer 403a serving as a channel formation layer, and a conductive layer 405a and a conductive layer 406a serving as a source or drain electrode.

The conductive layer 401a is provided over a substrate 400a, the insulating layer 402a is provided over the conductive layer 401a, the oxide semiconductor layer 403a is provided over the conductive layer 401a with the insulating layer 402a interposed therebetween, and the conductive layer 405a and the conductive layer 406a are each provided over part of the oxide semiconductor layer 403a.

Further, in the transistor illustrated in FIG. 6A, an oxide insulating layer 407a is in contact with part of a top surface of the oxide semiconductor layer 403a (part of the oxide semiconductor layer 403a over which the conductive layer 405a and the conductive layer 406a are not provided). A protective insulating layer 409a is provided over the oxide insulating layer 407a.

Figure 6B:
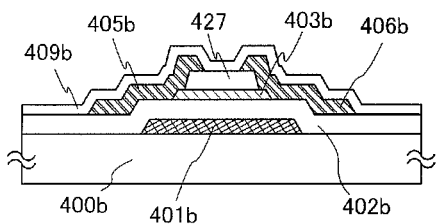

The transistor illustrated in FIG. 6B is a channel protective (also referred to as a channel stop) transistor which is one of the bottom-gate transistors, and is also referred to as an inverted staggered transistor.

The transistor illustrated in FIG. 6B includes a conductive layer 401b serving as a gate electrode, an insulating layer 402b serving as a gate insulating layer, an oxide semiconductor layer 403b serving as a channel formation layer, an insulating layer 427 serving as a channel protective layer, and a conductive layer 405b and a conductive layer 406b serving as a source or drain electrode.

The conductive layer 401b is provided over a substrate 400b, the insulating layer 402b is provided over the conductive layer 401b, the oxide semiconductor layer 403b is provided over the conductive layer 401b with the insulating layer 402b interposed therebetween, the insulating layer 427 is provided over the conductive layer 401b with the insulating layer 402b and the oxide semiconductor layer 403b interposed therebetween, and the conductive layer 405b and the conductive layer 406b are provided over part of the oxide semiconductor layer 403b with the insulating layer 427 interposed therebetween. Further, a structure can be employed in which the entire oxide semiconductor layer 403b overlaps with the conductive layer 401b. When the entire oxide semiconductor layer 403b overlaps with the conductive layer 401b, light can be prevented from entering the oxide semiconductor layer 403b. The structure which is employed is not limited thereto, and a structure can be employed in which the conductive layer 401b overlaps with part of the oxide semiconductor layer 403b.

Further, a protective insulating layer 409b is in contact with a top part of the transistor illustrated in FIG. 6B.

Figure 6C:
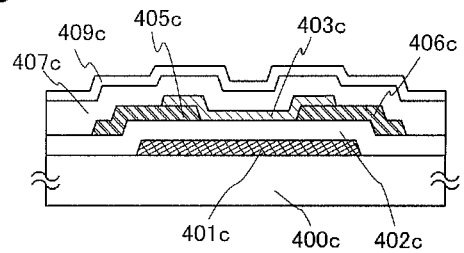

The transistor illustrated in FIG. 6C is one of the bottom-gate transistors.

The transistor illustrated in FIG. 6C includes a conductive layer 401c serving as a gate electrode, an insulating layer 402c serving as a gate insulating layer, an oxide semiconductor layer 403c serving as a channel formation layer, and a conductive layer 405c and a conductive layer 406c serving as a source or drain electrode.

The conductive layer 401c is provided over a substrate 400c, the insulating layer 402c is provided over the conductive layer 401c, the conductive layer 405c and the conductive layer 406c are provided over part of the insulating layer 402c, and the oxide semiconductor layer 403c is provided over the conductive layer 401c with the insulating layer 402c, the conductive layer 405c, and the conductive layer 406c interposed therebetween. Further, a structure can be employed in which the entire oxide semiconductor layer 403c overlaps with the conductive layer 401c. When the entire oxide semiconductor layer 403c overlaps with the conductive layer 401c, light can be prevented from entering the oxide semiconductor layer 403c. The structure which is employed is not limited thereto, and a structure can be employed in which the conductive layer 401c overlaps with part of the oxide semiconductor layer 403c.

Further, in FIG. 6C, an oxide insulating layer 407c is in contact with a top surface and a side surface of the oxide semiconductor layer 403c of the transistor. In addition, a protective insulating layer 409c is provided over the oxide insulating layer 407c.

Figure 6D:
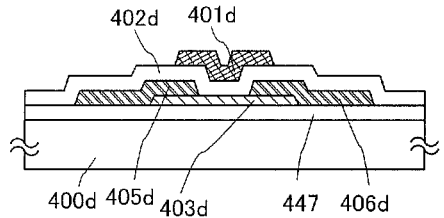

The transistor illustrated in FIG. 6D is one of top-gate transistors.

The transistor illustrated in FIG. 6D includes a conductive layer 401d serving as a gate electrode, an insulating layer 402d serving as a gate insulating layer, an oxide semiconductor layer 403d serving as a channel formation layer, and a conductive layer 405d and a conductive layer 406d serving as a source or drain electrode.

The oxide semiconductor layer 403d is provided over a substrate 400d with an insulating layer 447 interposed therebetween, the conductive layer 405d and the conductive layer 406d are each provided over part of the oxide semiconductor layer 403d, the insulating layer 402d is provided over the oxide semiconductor layer 403d, the conductive layer 405d, and the conductive layer 406d, and the conductive layer 401d is provided over the oxide semiconductor layer 403d with the insulating layer 402d interposed therebetween.

Components of the transistors will be described with reference to FIGS. 6A to 6D.

As the substrates 400a to 400d, for example, a glass substrate such as a barium borosilicate glass substrate or an aluminoborosilicate glass substrate can be used.

Alternatively, a substrate such as a ceramic substrate, a quartz substrate, or a sapphire substrate can be used as the substrates 400a to 400d. Further alternatively, a crystallized glass substrate can be used as the substrates 400a to 400d. Still further alternatively, a plastic substrate or a semiconductor substrate of silicon or the like can be used as the substrates 400a to 400d.

The insulating layer 447 has a function of a base layer which prevents diffusion of an impurity element from the substrate 400d. As the insulating layer 447, a silicon nitride layer, a silicon oxide layer, a silicon nitride oxide layer, a silicon oxynitride layer, an aluminum oxide layer, or an aluminum oxynitride layer can be used, for example. The insulating layer 447 can also be formed by stacking layers of materials which can be used for the insulating layer 447. Alternatively, as the insulating layer 447, a stack of a layer including a material having a light-blocking property and a layer including a material applicable to the insulating layer 447 can be used. When the insulating layer 447 includes a layer of a material having a light-blocking property, light can be prevented from entering the oxide semiconductor layer 403d.

Note that in the transistors illustrated in FIGS. 6A to 6C, an insulating layer may be provided between the substrate and the conductive layer serving as a gate electrode, as in the transistor illustrated in FIG. 6D.

As the conductive layers 401a to 401d, it is possible to use, for example, a layer of a metal material such as molybdenum, titanium, chromium, tantalum, tungsten, aluminum, copper, neodymium, or scandium or an alloy material containing any of these materials as a main component. The conductive layers 401a to 401d can also be formed by stacking layers of materials which can be applied to the conductive layers 401a to 401d.

As the insulating layers 402a to 402d, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer can be used, for example. The insulating layers 402a to 402d can also be formed by stacking layers of materials which can be applied to the insulating layers 402a to 402d. The layers of materials which can be applied to the insulating layers 402a to 402d can be formed by a plasma CVD method, a sputtering method, or the like. For example, the insulating layers 402a to 402d can be formed in such a manner that a silicon nitride layer is formed by a plasma CVD method and a silicon oxide layer is formed over the silicon nitride layer by a plasma CVD method.

As an oxide semiconductor which can be used for the oxide semiconductor layers 403a to 403d, for example, a four-component metal oxide, a three-component metal oxide, or a two-component metal oxide can be given. As the four-component metal oxide, for example, an In—Sn—Ga—Zn—O-based metal oxide can be used. As the three-component metal oxide, for example, an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, or a Sn—Al—Zn—O-based metal oxide can be used. As the two-component metal oxide, for example, an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, or an In—Sn—O-based metal oxide can be used. In addition, an In—O-based metal oxide, a Sn—O-based metal oxide, a Zn—O-based metal oxide, or the like can also be used as the oxide semiconductor. The metal oxide that can be used as the oxide semiconductor may contain $SiO_2$. Here, for example, the In—Ga—Zn—O-based metal oxide means an oxide containing at least In, Ga, and Zn, and the composition ratio of the elements is not particularly limited. The In—Ga—Zn—O-based metal oxide may contain an element other than In, Ga, and Zn.

Further, as an oxide semiconductor which can be used for the oxide semiconductor layers 403a to 403d, a metal oxide represented by a chemical formula $InMO_3(ZnO)_m$ (m is larger than 0) can be used. Here, M denotes one or more of metal elements selected from Ga, Al, Mn, and Co. For example, M can be Ga, Ga and Al, Ga and Mn, or Ga and Co.

As the conductive layers 405a to 405d and the conductive layers 406a to 406d, a layer of a metal material such as aluminum, chromium, copper, tantalum, titanium, molybdenum, or tungsten or an alloy material containing any of the metal materials as a main component can be used, for example. The conductive layers 405a to 405d and the conductive layers 406a to 406d can also be formed by stacking layers of materials which can be applied to the conductive layers 405a to 405d and the conductive layers 406a to 406d.

For example, the conductive layers 405a to 405d and the conductive layers 406a to 406d can be formed by stacking a metal layer of aluminum or copper and a high-melting-point metal layer of titanium, molybdenum, tungsten, or the like. The conductive layers 405a to 405d and the conductive layers 406a to 406d may have a structure in which a metal layer of aluminum or copper is provided between a plurality of high-melting-point metal layers. Further, when the conductive layers 405a to 405d and the conductive layers 406a to 406d are formed using an aluminum layer to which an element that prevents generation of hillocks or whiskers (e.g., Si, Nd, or Sc) is added, heat resistance can be increased.

Alternatively, the conductive layers 405a to 405d and the conductive layers 406a to 406d can be formed using a layer containing a conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, abbreviated to ITO), an alloy of indium oxide and zinc oxide ($In_2O_3$—ZnO), or such a metal oxide material containing silicon oxide can be used, for example.

Furthermore, another wiring may be formed using the material used to form the conductive layers 405a to 405d and the conductive layers 406a to 406d.

As the insulating layer 427, a layer which can be applied to the insulating layer 447 can be used, for example. The insulating layer 427 can also be formed by stacking layers of materials which can be applied to the insulating layer 427.

As the oxide insulating layer 407a and the oxide insulating layer 407c, an oxide insulating layer such as a silicon oxide layer can be used. The oxide insulating layer 407a and the oxide insulating layer 407c can also be formed by stacking layers of materials which can be applied to the oxide insulating layer 407a and the oxide insulating layer 407c.

As the protective insulating layers 409a to 409c, an inorganic insulating layer such as a silicon nitride layer, an aluminum nitride layer, a silicon nitride oxide layer, or an aluminum nitride oxide layer can be used, for example. The protective insulating layers 409a to 409c can also be formed by stacking layers of materials which can be applied to the protective insulating layers 409a to 409c.

Note that in the display devices in the above embodiments, in order to reduce surface unevenness due to the transistor of this embodiment, a planarization insulating layer can be provided over the transistor (in the case where the transistor includes an oxide insulating layer or a protective insulating layer, over the transistor with the oxide insulating layer or the protective insulating layer interposed therebetween). As the planarization insulating layer, a layer of an organic material such as polyimide, acrylic, or benzocyclobutene can be used. Alternatively, a layer of a low-dielectric constant material (a low-k material) can be used as the planarization insulating layer. The planarization insulating layer can also be formed by stacking layers of materials which can be applied to the planarization insulating layer.

Next, as an example of a method for manufacturing the transistor in this embodiment, an example of a method for manufacturing the transistor illustrated in FIG. 6A will be described with reference to FIGS. 7A to 7C and FIGS. 8A and 8B. FIGS. 7A to 7C and FIGS. 8A and 8B are cross-sectional schematic diagrams illustrating an example of the method for manufacturing the transistor illustrated in FIG. 6A.

First, the substrate 400a is prepared, and a first conductive film is formed over the substrate 400a.

A glass substrate is used as an example of the substrate 400a.

As the first conductive film, a film of a metal material such as molybdenum, titanium, chromium, tantalum, tungsten, aluminum, copper, neodymium, or scandium, or an alloy material which contains any of the metal materials as a main component can be used. The first conductive film can also be formed by stacking layers of materials which can be applied to the first conductive film.

Next, a first photolithography process is carried out: a first resist mask is formed over the first conductive film, the first conductive film is selectively etched with the use of the first resist mask to form the conductive layer 401a, and the first resist mask is removed.

Note that in this embodiment, the resist mask may be formed by an ink-jet method. Formation of the resist mask by an ink-jet method needs no photomask; thus, manufacturing cost can be reduced.

In order to reduce the number of photomasks and steps in the photolithography process, the etching step may be performed using a resist mask formed with a multi-tone mask. The multi-tone mask is a light-exposure mask through which light is transmitted to have a plurality of intensities. A resist mask formed with the use of the multi-tone mask has a plurality of thicknesses and further can be changed in shape by etching; therefore, the resist mask can be used in a plurality of etching steps for processing into different patterns. Therefore, a resist mask corresponding to at least two kinds of different patterns can be formed with one multi-tone mask. Thus, the number of light-exposure masks can be reduced and the number of corresponding photolithography steps can also be reduced, whereby a manufacturing process can be simplified.

Next, the insulating layer 402a is formed over the conductive layer 401a.

For example, the insulating layer 402a can be formed by a high-density plasma CVD method. For example, high-density plasma CVD using microwaves (e.g., microwaves with a frequency of 2.45 GHz) is preferably used for formation of the insulating layer 402a because it enables an insulating layer to be dense and to have a high breakdown voltage and high quality. When the oxide semiconductor layer is in contact with the high-quality insulating layer formed by high-density plasma CVD, the interface state can be reduced and favorable interface characteristics can be obtained.

The insulating layer 402a can also be formed by another method such as a sputtering method or a plasma CVD method. Further, heat treatment may be performed after the formation of the gate insulating layer 402a. The heat treatment performed after the formation of the gate insulating layer 402a can improve the quality of the insulating layer 402a and the interface characteristics between the insulating layer 402a and the oxide semiconductor.

Next, an oxide semiconductor film 530 having a thickness of 2 nm to 200 nm inclusive, preferably 5 nm to 30 nm inclusive is formed over the insulating layer 402a. For example, the oxide semiconductor film 530 can be formed by a sputtering method.

Note that before the formation of the oxide semiconductor film 530, powdery substances (also referred to as particles or dust) attached on a surface of the insulating layer 402a are preferably removed by reverse sputtering in which an argon gas is introduced and plasma is generated. The reverse sputtering refers to a method in which, without application of voltage to a target side, an RF power source is used for application of voltage to a substrate side in an argon atmosphere, so that plasma is generated to modify a surface of the substrate. Note that instead of argon, nitrogen, helium, oxygen, or the like may be used.

For example, the oxide semiconductor film 530 can be formed using an oxide semiconductor material which can be used as a material of the oxide semiconductor layer 403a. In this embodiment, as an example, the oxide semiconductor film 530 is formed by a sputtering method with the use of an In—Ga—Zn—O-based oxide target. A cross-sectional schematic view at this stage corresponds to FIG. 7A. Alternatively, the oxide semiconductor film 530 can be formed by a sputtering method in a rare gas (typically, argon) atmosphere, an oxygen atmosphere, or a mixed atmosphere of a rare gas and oxygen.

As a target for forming the oxide semiconductor film 530 by a sputtering method, for example, an oxide target having a composition ratio of $In_2O_3:Ga_2O_3:ZnO=1:1:1$ [molar ratio] can be used. Without limitation to the above target, an oxide target having a composition ratio of $In_2O_3:Ga_2O_3:ZnO=1:1:2$ [molar ratio] may be used, for example. The proportion of the volume of a portion except for an area occupied by a space and the like with respect to the total volume of the oxide target (also referred to as the filling rate) is 90% to 100% inclusive, and preferably 95% to 99.9% inclusive. The oxide semiconductor film formed using a metal oxide target having high filling rate has high density.

Note that as a sputtering gas used for forming the oxide semiconductor film 530, for example, a high-purity gas from which an impurity such as hydrogen, water, hydroxyl groups, or hydride is removed is preferably used.

Before the formation of the oxide semiconductor film 530, it is preferable that the substrate 400a over which the conductive layer 401a is formed or the substrate 400a over which the conductive layer 401a and the insulating layer 402a are formed be heated in a preheating chamber of a sputtering apparatus, so that an impurity such as hydrogen or moisture adsorbed on the substrate 400a is eliminated and removed. The heating in the preheating chamber can prevent hydrogen, hydroxyl groups, and moisture from entering the insulating layer 402a and the oxide semiconductor film 530. It is preferable that an evacuation means such as a cryopump be provided for the preheating chamber. The heating in the preheating chamber may be omitted. Alternatively, after the steps up to and including formation of the conductive layer 405a and the conductive layer 406a are performed and before the oxide insulating layer 407a is formed, the substrate 400a may be subjected to heating in the preheating chamber in a similar manner.

When the oxide semiconductor film 530 is formed by a sputtering method, the substrate 400a is held inside a film formation chamber which is kept in a reduced pressure state, and the temperature of the substrate 400a is set to 100° C. to 600° C. inclusive, preferably 200° C. to 400° C. inclusive. By increasing the temperature of the substrate 400a, the concentration of an impurity contained in the oxide semiconductor film 530 can be reduced. Further, damage on the oxide semiconductor film 530 due to sputtering can be reduced. Then, a sputtering gas from which hydrogen and moisture are removed is introduced while remaining moisture in the film formation chamber is removed, and the above-described target is used; thus, the oxide semiconductor film 530 is formed over the insulating layer 402a.

Note that in this embodiment, for example, an entrapment vacuum pump can be used as a means for removing moisture remained in the film formation chamber in which sputtering is performed. As the entrapment vacuum pump, a cryopump, an ion pump, or a titanium sublimation pump can be used, for example. When a cryopump is used as an example, a compound including either or both of a hydrogen atom and a carbon atom, or the like can be evacuated, and thus the concentration of an impurity included in a film formed in the film formation chamber can be reduced. Further, in this embodiment, a turbo pump provided with a cold trap may be used as a means for removing moisture remained in the film formation chamber in which sputtering is performed.

As one example of the film formation conditions, the following can be employed: the distance between the substrate and the target is 100 mm, the pressure is 0.6 Pa, the direct-current (DC) power is 0.5 kW, and the atmosphere is an oxygen atmosphere (the proportion of oxygen flow is 100%). Note that when a pulsed direct-current power supply is used, powdery substances generated at the time of film formation can be reduced and the film thickness can be made uniform.

Next, a second photolithography process is carried out: a second resist mask is formed over the oxide semiconductor film 530, the oxide semiconductor film 530 is selectively etched with the use of the second resist mask to process the oxide semiconductor film 530 into an island-shaped oxide semiconductor layer, and the second resist mask is removed.

In the case of forming a contact hole in the insulating layer 402a, the contact hole can be formed at the time of processing the oxide semiconductor film 530 into the island-shaped oxide semiconductor layer.

For example, dry etching, wet etching, or both dry etching and wet etching can be employed for etching the oxide semiconductor film 530. As an etchant used for wet etching of the oxide semiconductor film 530, a mixed solution of phosphoric acid, acetic acid, and nitric acid can be used, for example. Further, ITO07N (produced by KANTO CHEMICAL CO., INC.) may also be used.

Next, heat treatment is performed. Through the heat treatment, the island-shaped oxide semiconductor layer can be dehydrated or dehydrogenated. The temperature of the heat treatment is 400° C. to 750° C. inclusive, or higher than or equal to 400° C. and lower than the strain point of the substrate. Here, the substrate is put in an electric furnace that is a kind of heat treatment apparatus and heat treatment is performed on the island-shaped oxide semiconductor layer in a nitrogen atmosphere at 450° C. for one hour, and then the oxide semiconductor layer is not exposed to the air so that reentry of water and hydrogen into the island-shaped oxide semiconductor layer is prevented. In this manner, the oxide semiconductor layer 403a is obtained (see FIG. 7B).

The heat treatment apparatus is not limited to the electric furnace and may be the one provided with a device for heating a process object using heat conduction or heat radiation from a heating element such as a resistance heating element. For example, an RTA (rapid thermal annealing) apparatus such as a GRTA (gas rapid thermal annealing) apparatus or an LRTA (lamp rapid thermal annealing) apparatus can be used. An LRTA apparatus is an apparatus for heating a process object by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus for heat treatment using a high-temperature gas. As the high-temperature gas, an inert gas which does not react with a process object by heat treatment, such as nitrogen or a rare gas like argon, is used.

For example, as the heat treatment, heat treatment may be performed with the use of a GRTA apparatus in the following manner. The substrate 400a over which the layers up to the island-shaped oxide semiconductor layer are formed is transferred to an inert gas which has been heated to 650° C. to 700° C., heated for several minutes, and taken out of the heated inert gas.

Note that in the heat treatment, it is preferable that water, hydrogen, and the like be not contained in nitrogen or a rare gas such as helium, neon, or argon. It is also preferable that nitrogen or a rare gas such as helium, neon, or argon introduced into the heat treatment apparatus have a purity of 6N (99.9999%) or more, preferably 7N (99.99999%) or more (that is, the impurity concentration is set to be lower than or equal to 1 ppm, preferably lower than or equal to 0.1 ppm).

After the island-shaped oxide semiconductor layer is heated by the heat treatment, a high-purity oxygen gas, a high-purity $N_2O$ gas, or ultra-dry air (having a dew point of −40° C. or lower, preferably −60° C. or lower) may be introduced into the furnace that has been used in the heat treatment. It is preferable that the oxygen gas or the $N_2O$ gas do not contain water, hydrogen, and the like. The purity of the oxygen gas or the $N_2O$ gas which is introduced into the heat treatment apparatus is preferably 6N or more, more preferably 7N or more (i.e., the impurity concentration of the oxygen gas or the $N_2O$ gas is preferably lower than or equal to 1 ppm, more preferably lower than or equal to 0.1 ppm). By the effect of the oxygen gas or the $N_2O$ gas, oxygen that has been reduced through the step of eliminating an impurity by the dehydration or dehydrogenation treatment is supplied; thus, the oxide semiconductor layer 403a is highly purified.

The heat treatment may also be performed on the oxide semiconductor film 530 which has not been processed into the island-shaped oxide semiconductor layer with the use of the above heat treatment apparatus. In that case, after the heat treatment, the substrate 400a over which the layers up to the oxide semiconductor film 530 are formed is taken out of the heat treatment apparatus and the oxide semiconductor film 530 is processed into the island-shaped oxide semiconductor layer.

Other than the above-described timings, the heat treatment may be performed after the formation of the oxide semiconductor film 530, for example, after formation of the conductive layer 405a and the conductive layer 406a over the oxide semiconductor layer 403a or after formation of the oxide insulating layer 407a over the conductive layer 405a and the conductive layer 406a.

In the case of forming a contact hole in the insulating layer 402a, the contact hole may be formed before the heat treatment is performed.

The oxide semiconductor layer may be formed using an oxide semiconductor film which is formed through two deposition steps and two heat treatments so as to be a thick film including a crystalline region (a single crystal region), that is, a crystalline region having a c-axis aligned in a direction perpendicular to a surface of the film, regardless of the material of a base component such as an oxide, a nitride, or a metal. For example, a first oxide semiconductor film with a thickness of 3 nm to 15 nm inclusive is deposited and subjected to first heat treatment at 450° C. to 850° C. inclusive, preferably 550° C. to 750° C. inclusive under an atmosphere of nitrogen, oxygen, a rare gas, or dry air, so that the first oxide semiconductor film which includes a crystalline region (including a plate-like crystal) in a region including a surface is formed. Then, a second oxide semiconductor film that is thicker than the first oxide semiconductor film is formed and subjected to second heat treatment at 450° C. to 850° C. inclusive, preferably 600° C. to 700° C. inclusive, so that crystal growth proceeds toward the upper side from the first oxide semiconductor film to the second oxide semiconductor film using the first oxide semiconductor film as a seed of the crystal growth, and the entire region of the second oxide semiconductor film is crystallized. Using the film including a crystalline region, which is thick as a consequence, an oxide semiconductor layer may be formed.

Next, a second conductive film is formed over the insulating layer 402a and the oxide semiconductor layer 403a.

As the second conductive film, a film of a metal material such as aluminum, chromium, copper, tantalum, titanium, molybdenum, or tungsten, or an alloy material which contains any of the metal materials as a main component can be used, for example. The second conductive film can also be formed by stacking films of materials which can be applied to the second conductive film.

Figure 7A:
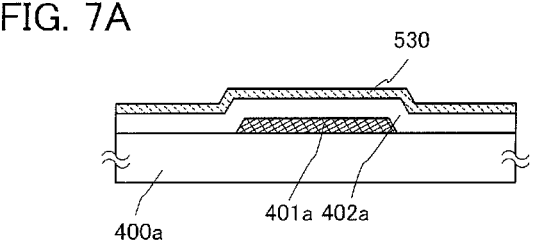
FIGS. 7A to 7C are cross-sectional schematic views illustrating an example of a method for manufacturing the transistor illustrated in FIG. 6A.
Figure 7B:
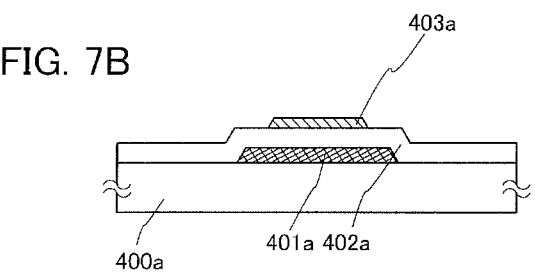
Figure 7C:
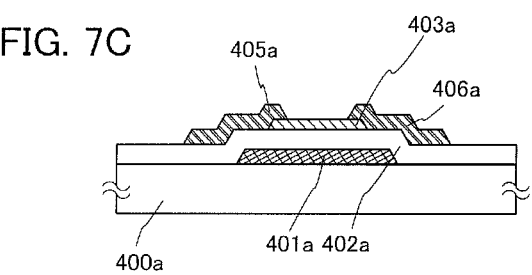

Next, a third photolithography process is carried out: a third resist mask is formed over the second conductive film, the second conductive film is selectively etched with the use of the third resist mask to form the conductive layer 405a and the conductive layer 406a, and the third resist mask is removed (see FIG. 7C).

Note that another wiring may be formed using the second conductive film at the time of forming the conductive layer 405a and the conductive layer 406a.

In light exposure in forming the third resist mask, ultraviolet light, KrF laser light, or ArF laser light is preferably used. A channel length L of the transistor to be completed later depends on the width of an interval between a bottom end of the conductive layer 405a and a bottom end of the conductive layer 406a which are adjacent to each other over the oxide semiconductor layer 403a. In the case where the channel length L is less than 25 nm, the light exposure at the time of forming the third resist mask is preferably performed using extreme ultraviolet light having an extremely short wavelength of several nanometers to several tens of nanometers. In light exposure using extreme ultraviolet light, resolution is high and depth of focus is large. Therefore, the channel length L of the transistor to be completed later can be made 10 nm to 1000 nm inclusive, and the use of the transistor formed through such light exposure enables higher speed operation of a circuit. In addition, the off-state current of the transistor is extremely small, which results in a reduction in power consumption.

In the case of etching the second conductive film, etching conditions are preferably optimized in order to prevent the oxide semiconductor layer 403*a* from being divided by the etching. However, it is difficult to set the conditions under which only the second conductive film can be etched and the oxide semiconductor layer 403*a* is not etched at all. In some cases, part of the oxide semiconductor layer 403*a* is etched at the time of etching the second conductive film, whereby the oxide semiconductor layer 403*a* comes to include a groove portion (depression portion).

In this embodiment, a titanium film is used as an example of the second conductive film, an In—Ga—Zn—O-based oxide semiconductor is used as an example of the oxide semiconductor layer 403*a*, and an ammonia hydrogen peroxide mixture (a mixture of ammonia, water, and hydrogen peroxide water) is used as an etchant.

Next, the oxide insulating layer 407*a* is formed over the oxide semiconductor layer 403*a*, the conductive layer 405*a*, and the conductive layer 406*a*. At this time, the oxide insulating layer 407*a* is in contact with part of the top surface of the oxide semiconductor layer 403*a*.

The oxide insulating layer 407*a* can be formed to a thickness of at least 1 nm or more using a method by which impurities such as water or hydrogen are not mixed into the oxide insulating layer 407*a*, such as a sputtering method, as appropriate. When hydrogen is contained in the oxide insulating layer 407*a*, entry of the hydrogen to the oxide semiconductor layer, or extraction of oxygen in the oxide semiconductor layer by the hydrogen is caused, thereby causing the backchannel of the oxide semiconductor layer to have lower resistance (to have an n-type conductivity), so that a parasitic channel might be formed. Therefore, in order to form the oxide insulating layer 407*a* containing as little hydrogen as possible, it is important to employ a method in which hydrogen is not used as a method for forming the oxide insulating layer 407*a*.

In this embodiment, as an example of the oxide insulating layer 407*a*, a silicon oxide film having a thickness of 200 nm is formed by a sputtering method. The temperature of the substrate 400*a* at the time of the film formation may be room temperature to 300° C. inclusive; in this embodiment, 100° C. as an example. The formation of a silicon oxide film by a sputtering method can be performed in a rare gas (typically, argon) atmosphere, an oxygen atmosphere, or a mixed atmosphere of a rare gas and oxygen.

Further, a silicon oxide target or a silicon target can be used as a target for forming the oxide insulating layer 407*a*. For example, with the use of a silicon target, a silicon oxide film can be formed by a sputtering method under all atmosphere containing oxygen.

As a sputtering gas used for forming the oxide insulating layer 407*a*, for example, a high-purity gas from which all impurity such as hydrogen, water, hydroxyl groups, or hydride is removed is preferably used.

Before formation of the oxide insulating layer 407*a*, plasma treatment with the use of a gas such as $N_2O$, $N_2$, or Ar may be performed to remove water or the like adsorbed on an exposed surface of the oxide semiconductor layer 403*a*. In the case where plasma treatment is performed, the oxide insulating layer 407*a* which is in contact with part of the upper surface of the oxide semiconductor layer 403*a* is preferably formed without exposure to the air.

Further, heat treatment (preferably, at 200° C. to 400° C. inclusive, for example, 250° C. to 350° C. inclusive) can be performed in an inert gas atmosphere or in an oxygen gas atmosphere. For example, as the heat treatment performed in an inert gas atmosphere or an oxygen gas atmosphere, the heat treatment is performed in a nitrogen atmosphere at 250° C. for one hour. Through the heat treatment in an inert gas atmosphere or an oxygen gas atmosphere, heat is applied while part of the upper surface of the oxide semiconductor layer 403*a* is in contact with the oxide insulating layer 407*a*.

Through the above-described process, an impurity such as hydrogen, moisture, hydroxyl groups, or hydride (also referred to as a hydrogen compound) can be intentionally removed from the oxide semiconductor layer, and in addition, oxygen can be supplied to the oxide semiconductor layer. Therefore, the oxide semiconductor layer is highly purified.

Figure 8A:
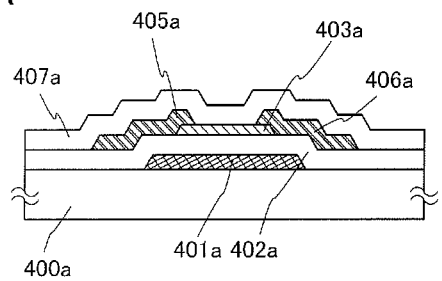
FIGS. 8A and 8B are cross-sectional schematic views illustrating an example of a method for manufacturing the transistor illustrated in FIG. 6A.
Figure 8B:
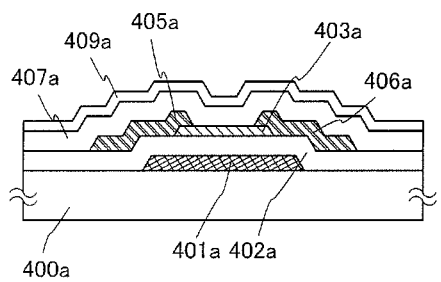

Through the above-described process, the transistor is formed (see FIG. 8A).

When a silicon oxide layer having many defects is used as the oxide insulating layer 407*a*, the heat treatment after formation of the silicon oxide layer has an effect of diffusing an impurity such as hydrogen, moisture, hydroxyl groups, or hydride contained in the oxide semiconductor layer 403*a* to the oxide insulating layer 407*a*, so that the impurity contained in the oxide semiconductor layer 403*a* can be further reduced.

The protective insulating layer 409*a* may be further formed over the oxide insulating layer 407*a*. As the protective insulating layer 409*a*, a silicon nitride film can be formed by an RF sputtering method, for example. Since the RF sputtering method has high productivity, it is preferably used as a deposition method of an insulating film used for forming the protective insulating layer 409*a*. In this embodiment, as an example, a silicon nitride film is formed as the protective insulating layer 409*a* (see FIG. 8B).

In this embodiment, the protective insulating layer 409*a* is formed in such a manner that the substrate 400*a* over which layers up to the oxide insulating layer 407*a* are formed is heated at a temperature of 100° C. to 400° C., a sputtering gas containing high-purity nitrogen from which hydrogen and moisture are removed is introduced, and a silicon nitride film is formed with the use of a target of a silicon semiconductor. In that case also, the protective insulating layer 409*a* is preferably formed while remaining moisture in a treatment chamber is removed, similarly to the case of forming the oxide insulating layer 407*a*.

After formation of the protective insulating layer 409*a*, heat treatment may be further performed at 100° C. to 200° C. inclusive under the air for 1 hour to 30 hours inclusive. The heat treatment may be performed at a fixed heating temperature. Alternatively, the following change in heating temperature may be conducted plural times repeatedly: the heating temperature is increased from a room temperature to a temperature higher than or equal to 100° C. and lower than or equal to 200° C. and then decreased to a room temperature. That is an example of the method for manufacturing the transistor illustrated in FIG. 6A.

Although an example of the manufacturing method of the transistor illustrated in FIG. 6A is shown as an example of the method for manufacturing the transistor in this embodiment, the present invention is not limited to this example. For example, as for the components of FIGS. 6B to 6D which have the same designations as the components of FIG. 6A and whose function is at least partly the same as that of the components of FIG. 6A, description of the example of the manufacturing method of the transistor illustrated in FIG. 6A can be referred to as appropriate.

As described above, the transistor shown in this embodiment is a transistor including an oxide semiconductor layer as a channel formation layer. The oxide semiconductor layer used in the transistor is highly purified by heat treatment and thereby becoming an i-type or substantially i-type oxide semiconductor layer.

The highly-purified oxide semiconductor layer includes extremely few carriers (close to 0). The carrier concentration of the oxide semiconductor layer is less than $1\times10^{14}/cm^3$, preferably less than $1\times10^{12}/cm^3$, and more preferably less than $1\times10^{11}/cm^3$. Since the number of carriers in the oxide semiconductor layer is extremely small, the off-state current of the transistor of this embodiment can be reduced. It is preferable that the off-state current be as small as possible. In the transistor of this embodiment, the off-state current per micrometer of channel width can be made less than equal to 10 aA ($1\times10^{-17}$ A), less than or equal to 1 aA ($1\times10^{-18}$ A), less than or equal to 10 zA ($1\times10^{-20}$ A), and further less than or equal to 1 zA ($1\times10^{-21}$ A).

The transistor of this embodiment has a relatively high field-effect mobility; therefore, a circuit including the transistor can be driven at high speed.

When the transistor of this embodiment is used in the display device of the above embodiments, a period in which an image based on image data in displaying a still image is held can be made longer, so that power consumption of the display device can be reduced.

Moreover, when the shift register described in the above embodiment is formed using the transistor of this embodiment, a pixel portion, a scan signal line driver circuit, and an image signal line driver circuit can be formed over one substrate in the same process, so that manufacturing cost of the display device can be reduced.

Note that this embodiment can be combined with or replaced by any of the other embodiments as appropriate.

Embodiment 5

In this embodiment, an example of a structure of the display device described in the above embodiments will be described.

Figure 9:
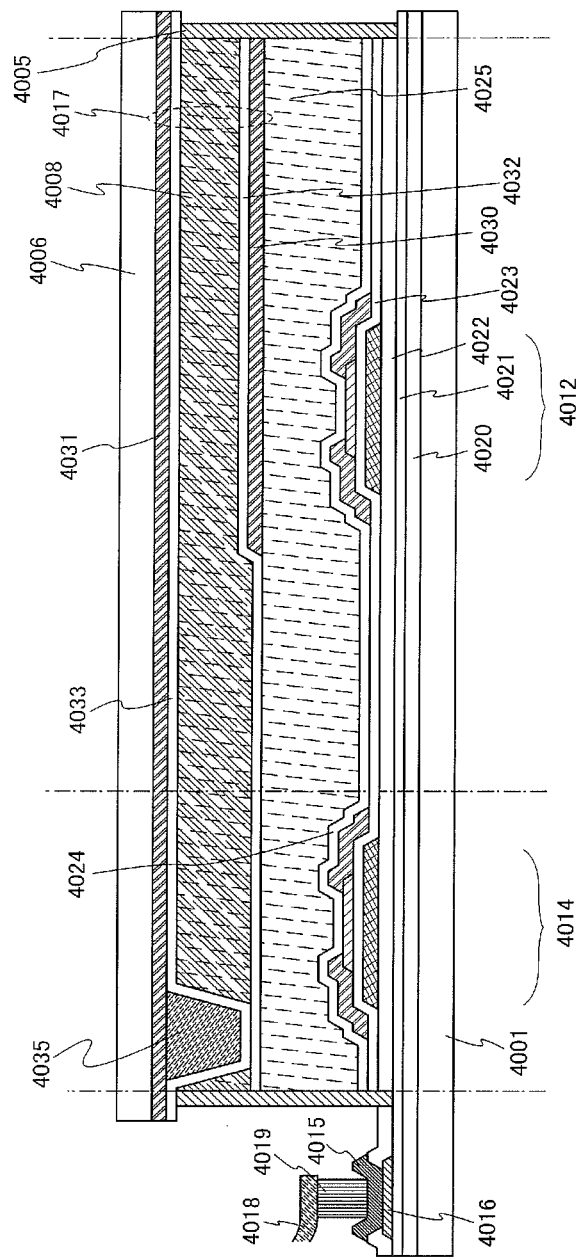
FIG. 9 is a view illustrating an example of a structure of a display device in Embodiment 5.

An example of a structure of a display device of this embodiment will be described with reference to FIG. 9. FIG. 9 is a cross-sectional schematic view illustrating an example of a structure of the display device of this embodiment.

The display device illustrated in FIG. 9 includes a pixel portion and a driver circuit portion in a region which is sealed with a sealant 4005 between a substrate 4001 and a substrate 4006. The pixel portion includes a transistor 4012 and the driver circuit portion includes a transistor 4014.

Note that part of a driver circuit used in the driver circuit portion can be formed using a driver circuit which is provided over another substrate. In this case, there is no particular limitation on a method for connecting the display device illustrated in FIG. 9 and the driver circuit which is separately formed, and a COG method, a wire bonding method, a TAB method, or the like can be used.

As the transistor 4012, any one of the transistors described in Embodiment 4 can be used, for example. In FIG. 9, the transistor having the structure illustrated in FIG. 6A is used as an example of the transistor 4012.

As the transistor 4014, any one of the transistors described in Embodiment 4 can be used, for example. In FIG. 9, the transistor having the structure illustrated in FIG. 6A is used as an example of the transistor 4014. Note that a conductive layer may be provided so as to overlap with an oxide semiconductor layer in the transistor 4014 with an insulating layer 4024 interposed therebetween.

Further, the display device illustrated in FIG. 9 includes a planarization layer 4025, a conductive layer 4030 serving as a pixel electrode, an insulating layer 4032, a liquid crystal layer 4008, an insulating layer 4033, an insulating layer 4035 serving as a spacer, and a conductive layer 4031 serving as a counter electrode.

The planarization layer 4025 is provided over the transistor 4012 and the transistor 4014. The conductive layer 4030 is provided over the planarization layer 4025. The insulating layer 4032 is provided over the planarization layer 4025 with the conductive layer 4030 interposed therebetween. The conductive layer 4031 is provided in contact with the substrate 4006. The insulating layer 4033 is provided in contact with the conductive layer 4031. The insulating layer 4035 is provided in a region surrounded by the sealant 4005. The liquid crystal layer 4008 is provided in a region surrounded by the sealant 4005 between the conductive layer 4030 and the conductive layer 4031 with the insulating layer 4032 and the insulating layer 4033 interposed therebetween.

A liquid crystal element 4017 is formed using the conductive layer 4030, the conductive layer 4031, and the liquid crystal layer 4008.

The conductive layer 4031 is electrically connected to a common voltage line provided over the same substrate as the transistor 4012 or the like. With the use of a connection portion with the common voltage line (also referred to as a common connection portion), the conductive layer 4031 can be electrically connected to the common voltage line via conductive particles arranged between the pair of substrates. The common voltage line is a wiring to which the voltage Vcom is supplied.

The insulating layer 4035 is a columnar spacer obtained by selective etching of an insulating film and provided in order to control a distance (a cell gap) between the conductive layer 4030 and the conductive layer 4031. Alternatively, a spherical spacer may be used as the insulating layer 4035. Note that the insulating layer 4035 may be provided between the conductive layer 4030 and the conductive layer 4031 with the insulating layer 4032 and the insulating layer 4035 interposed therebetween.

Further, the display device illustrated in FIG. 9 is electrically connected to a FPC 4018 through a conductive layer 4016 provided over the substrate 4001 with the insulating layer 4020 and the insulating layer 4021 interposed therebetween, a conductive layer 4015 in contact with the conductive layer 4016, and an anisotropic conductive layer 4019. The conductive layer 4015 and the conductive layer 4016 function as terminal electrodes.

The conductive layer 4015 is formed using the same conductive film used for the conductive layer 4030, for example. The conductive layer 4016 is formed using the same conductive film used for the conductive layer serving as a source electrode or a drain electrode of the transistor 4014, for example.

As the substrate 4001 and the substrate 4006, a light-transmitting substrate such as a glass substrate, a plastic substrate, or the like can be used, for example. As the plastic substrate, a fiberglass-reinforced plastics (FRP) plate, a polyvinyl fluoride (PVF) film, a polyester film, an acrylic resin film, or the like can be used, for example.

As the planarization layer 4025, a layer of an organic material having heat resistance, such as polyimide, acrylic, benzocyclobutene, polyamide, or epoxy, can be used. Other than the layer of such organic materials, it is also possible to use a low-dielectric constant material (low-k material), a siloxane-based resin, phosphosilicate glass (PSG), borophosphosilicate glass (BPSG), or the like as the planarization layer 4025. Alternatively, the planarization layer 4025 can be formed by stacking layers of materials which can be applied to the planarization layer 4025.

There is no particular limitation on the formation method of the planarization layer 4025. Depending on the material, the following method can be used: a sputtering method, an SOG method, a spin coating method, a dipping method, a spray coating method, a droplet discharge method (e.g., an ink-jet method, a screen printing method, or an offset printing method), a formation method with a doctor knife, a formation method with a roll coater, a formation method with a curtain coater, a formation method with a knife coater, or the like.

The conductive layer 4030 and the conductive layer 4031 can be formed using a layer of a light-transmitting conductive material such as indium tin oxide, a metal oxide in which zinc oxide is mixed in indium oxide (also referred to as indium zinc oxide (IZO)), a conductive material in which silicon oxide ($SiO_2$) is mixed in indium oxide, organoindium, organotin, indium oxide containing tungsten oxide, indium zinc oxide containing tungsten oxide, indium oxide containing titanium oxide, indium tin oxide containing titanium oxide, or the like. In the case where the display device of this embodiment is formed to be a reflective type, a layer of a metal such as tungsten, molybdenum, zirconium, hafnium, vanadium, niobium, tantalum, chromium, cobalt, nickel, titanium, platinum, aluminum, copper, or silver or an alloy of such a metal can be used as the conductive layer 4030 and the conductive layer 4031. The conductive layer 4030 and the conductive layer 4031 can also be formed by stacking layers of materials which can be applied to the conductive layer 4030 and the conductive layer 4031.

A conductive composition containing a conductive high molecule (also referred to as a conductive polymer) can be used for the conductive layer 4030 and the conductive layer 4031. It is preferable that the conductive layer formed using the conductive composition have a sheet resistance of 10000 Ω/square or less and a light transmittance of 70% or more at a wavelength of 550 nm. Furthermore, the resistivity of the conductive high molecule contained in the conductive composition is preferably 0.1 Ω·cm or less.

As the conductive high molecule, a so-called π-electron conjugated conductive polymer can be used. As the π-electron conjugated conductive polymer, polyaniline or a derivative thereof, polypyrrole or a derivative thereof, polythiophene or a derivative thereof, or a copolymer of two or more of aniline, pyrrole, and thiophene or a derivative thereof can be given.

As the sealant 4005, an insulating layer including a conductive particle can be used, for example.

As a display method of the display device provided with the liquid crystal element 4017, a TN (twisted nematic) mode, an IPS (in-plane-switching) mode, a VA (vertical alignment) mode, an ASM (axially symmetric aligned micro-cell) mode, an OCB (optically compensated birefringence) mode, an FLC (ferroelectric liquid crystal) mode, an AFLC (antiferroelectric liquid crystal) mode, an MVA (multi-domain vertical alignment) mode, a PVA (patterned vertical alignment) mode, an ASV mode, a FFS (fringe field switching) mode, or the like can be used.

Alternatively, as the liquid crystal layer 4008, liquid crystal layer showing a blue phase for which an alignment film is unnecessary may be used, for example. A blue phase is one of liquid crystal phases, which appears just before a cholesteric phase changes into an isotropic phase while temperature of cholesteric liquid crystal is increased. Since the blue phase appears only within a narrow range of temperatures, a liquid crystal composition containing a chiral agent at 5 wt % or more is used as a liquid crystal material in order to widen the temperature range. The liquid crystal composition which includes a liquid crystal showing a blue phase and a chiral agent has a short response time of 1 msec or less, has optical isotropy, which makes the alignment process unneeded, and has a small viewing angle dependence. In addition, since an alignment film does not need to be provided and rubbing treatment is unnecessary, electrostatic breakdown caused by rubbing treatment can be prevented and defects and damage of the liquid crystal display device can be reduced in the manufacturing process. Thus, productivity of the liquid crystal display device can be improved. A transistor including an oxide semiconductor layer particularly has a possibility that electric characteristics of the transistor might fluctuate significantly due to static electricity and deviate from the design range. Therefore, by using a liquid crystal material showing a blue phase for the display device including a transistor including an oxide semiconductor layer, the fluctuation of electric characteristics, which is due to static electricity, can be reduced.

In the display device of this embodiment, a polarizing plate may be provided on the outer side of the substrate (on the viewer side) and a coloring layer and an electrode layer used in a display element may be sequentially provided on the inner side of the substrate; alternatively, the polarizing plate may be provided on the inner side of the substrate. The stacked structure of the polarizing plate and the coloring layer may be set as appropriate in accordance with materials of the polarizing plate and the coloring layer and the condition of the manufacturing process. Further, a light-blocking layer serving as a black matrix may be provided in a portion other than the display portion.

Further, a black matrix (a light-blocking layer), an optical member (an optical substrate) such as a polarizing member, a retardation member, or an anti-reflection member, or the like can be provided as appropriate for the display device of this embodiment. For example, circular polarization may be obtained by using a polarizing substrate and a retardation substrate as the optical member. Further, a backlight or the like may be used as a light source.

In order to improve moving-image characteristics of a display device, a driving technique may be employed in which a plurality of LED (light-emitting diode) light sources or a plurality of EL light sources is used to form a surface light source as a backlight, and each light source of the surface light source is independently driven in a pulsed manner in one frame period. As the surface light source, three or more kinds of LEDs may be used and an LED emitting white light may be used. Since a plurality of LEDs can be controlled independently, the light emission timing of LEDs can be synchronized with the timing at which a liquid crystal layer is optically modulated. According to this driving technique, LEDs can be partly turned off; therefore, power consumption can be reduced particularly in the case of displaying an image having a large pan on which black is displayed.

Since the transistor in the display device is easily broken due to static electricity or the like, a protective circuit is preferably provided over the same substrate as the pixel portion or the drive circuit portion. The protective circuit is preferably formed with a non-linear element including the above-described oxide semiconductor layer, for example. For example, a protective circuit can be provided between the pixel portion, and a scan signal input terminal and an image signal input terminal. Further, the protective circuit includes non-linear elements arranged in parallel to each other with a scan signal line therebetween. The non-linear element includes a two-terminal element such as a diode or a three-terminal element such as a transistor. For example, the non-linear element can be formed through the same process as the transistor in the pixel portion, and characteristics similar to those of a diode can be obtained by connecting a gate to a drain of the non-linear element.

As described above, the display device of this embodiment has a structure in which the driver circuit and the pixel are formed over the same substrate. When such a structure is employed, the driver circuit and the pixel can be formed in the same process, whereby manufacturing cost can be reduced.

Note that this embodiment can be combined with or replaced by any of the other embodiments as appropriate.

Embodiment 6

In this embodiment, an electronic device provided with the display device of the above embodiments will be described.

Examples of structures of electronic devices in this embodiment will be described with reference to FIGS. 10A to 10F. FIGS. 10A to 10F illustrate examples of structures of electronic devices of this embodiment.

Figure 10A:
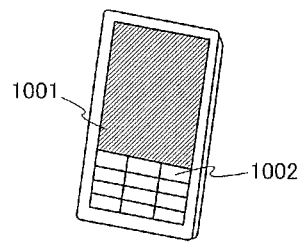
FIGS. 10A to 10F are views illustrating examples of structures of electronic devices in Embodiment 6.

An electronic device illustrated in FIG. 10A is a personal digital assistant. The personal digital assistant illustrated in FIG. 10A includes at least a display portion 1001. The personal digital assistant illustrated in FIG. 10A can be combined with a touch panel for example, and can be used as an alternative to a variety of portable objects. For example, the display portion 1001 is provided with an operation portion 1002, so that the personal digital assistant can be used as a mobile phone. Note that the operation portion 1002 is not necessarily provided in the display portion 1001. The personal digital assistant illustrated in FIG. 10A may be provided with an additional operation button. The personal digital assistant illustrated in FIG. 10A can be used as a notepad or a handy scanner. Further, the display device described in the above embodiments can realize a long interval between writing operations since a display period by one image-data writing is long. Therefore, by using the display device described in the above embodiments for the personal digital assistant illustrated in FIG. 10A, eyestrain can be suppressed even when a still image is seen on the display portion for a long period of time, for example.

Figure 10D:
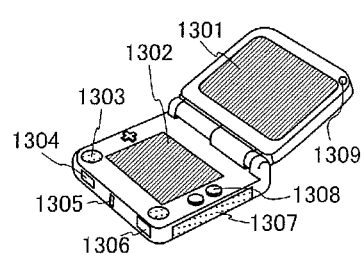
Figure 10B:
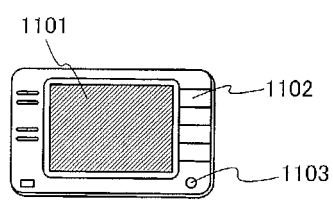

An electronic device illustrated in FIG. 10B is an information guide terminal including an automotive navigation system, for example. The information guide terminal illustrated in FIG. 10B includes at least a display portion 1101, and can also include operation buttons 1102 and an external input terminal 1103. The in-car temperature changes greatly in accordance with the outside-air temperature, and sometimes exceeds 50° C. Since characteristic change due to the temperature of the display device described in the above embodiments is small, the display device described in the above embodiments is particularly effective under circumstances where the temperature greatly changes such as the inside of a car.

Figure 10E:
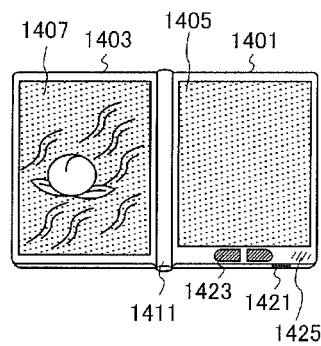
Figure 10C:
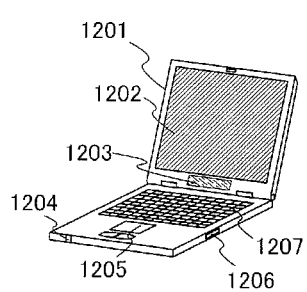

An electronic device illustrated in FIG. 10C is a notebook personal computer. The notebook personal computer illustrated in FIG. 10C includes a housing 1201, a display portion 1202, a speaker 1203, an LED lamp 1204, a pointing device 1205, a connection terminal 1206, and a keyboard 1207. Further, the display device described in the above embodiments can realize a long interval between writing operations since a display period by one image-data writing is long. Therefore, by using the display device described in the above embodiments for the notebook personal computer illustrated in FIG. 10C, eyestrain can be suppressed even when a still image is seen on the display portion for a long period of time, for example.

An electronic device illustrated in FIG. 10D is a portable game machine. The portable game machine illustrated in FIG. 10D includes a display portion 1301, a display portion 1302, a speaker 1303, a connection terminal 1304, an LED lamp 1305, a microphone 1306, a recording medium reading portion 1307, an operation button 1308, and a sensor 1309. The display device described in the above embodiments can realize a long interval between writing operations since a display period by one image-data writing is long. Therefore, by using the display device described in the above embodiments for the portable game machine illustrated in FIG. 10D, eyestrain can be suppressed even when an image is on the display portion for a long period of time, for example. Further, different images can be displayed on the display portion 1301 and the display portion 1302; for example, a moving image is displayed on one of them and a still image is displayed on the other. Accordingly, supply of voltage to the driver circuit in the display portion in which a still image is displayed can be stopped, whereby power consumption can be reduced.

An electronic device illustrated in FIG. 10E is an e-book reader. The e-book reader illustrated in FIG. 10E includes at least a housing 1401, a housing 1403, a display portion 1405, a display portion 1407, and a hinge 1411.

The housing 1401 and the housing 1403 are connected by the hinge 1411. The e-book reader illustrated in FIG. 10E can be opened and closed using the hinge 1411 as an axis. With such a structure, the e-book reader can be handled like a paper book. The display portion 1405 is incorporated into the housing 1401 and the display portion 1407 is incorporated into the housing 1403. The display portion 1405 and the display portion 1407 may display different images, or one image may be displayed across the display portion 1405 and the display portion 1407. In the structure where different images are displayed on the display portion 1405 and the display portion 1407, for example, the right display portion (the display portion 1405 in FIG. 10E) can display text and the left display portion (the display portion 1407 in FIG. 10E) can display an image.

In addition, the e-book reader illustrated in FIG. 10E may be provided with an operation portion or the like for the housing 1401 or the housing 1403. For example, the e-book reader illustrated in FIG. 10E may include a power button 1421, an operation key 1423, and a speaker 1425. In the e-book reader illustrated in FIG. 10E, pages can be turned with the operation key 1423. Further, the e-book reader illustrated in FIG. 10E may be provided with a keyboard, a pointing device, or the like for the display portion 1405 and/or the display portion 1407. Moreover, an external connection terminal (an earphone terminal, a USB terminal, a terminal connectable to a variety of cables such as an AC adapter or a USB cable), a storage medium insertion portion, and the like may be provided on a back surface or a side surface of the housing 1401 and the housing 1403 of the e-book reader illustrated in FIG. 10E. Further, the e-book reader illustrated in FIG. 10E may have a function of an electronic dictionary.

The display device described in the above embodiments can be provided for the display portion 1405 and/or the display portion 1407. Further, the display device described in the above embodiments can realize a long interval between writing operations since a display period by one image-data writing is long. Therefore, by using the display device described in the above embodiments for the e-book reader illustrated in FIG. 10E, eyestrain can be suppressed even when a still image is seen on the display portion for a long period of time, for example.

The e-book reader illustrated in FIG. 10E may transmit and receive data wirelessly. With such a structure, the e-book reader can have a function with which desired book data or the like can be purchased and downloaded from an electronic book server.

Figure 10F:
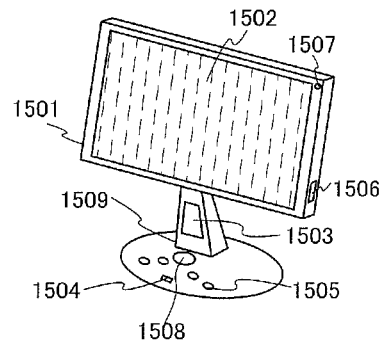

An electronic device illustrated in FIG. 10F is a display. The display illustrated in FIG. 10F includes a housing 1501, a display portion 1502, a speaker 1503, an LED lamp 1504, an operation button 1505, a connection terminal 1506, a sensor 1507, a microphone 1508, and a support base 1509. Further, the display device described in the above embodiments can realize a long interval between writing operations since a display period by one image-data writing is long. Therefore, by using the display device described in the above embodiments for the display illustrated in FIG. 10F, eyestrain can be suppressed even when a still image is seen on the display portions for a long period of time, for example.

The electronic device of this embodiment may have a power supply circuit including a solar battery cell, a power storage device for charging voltage that is output from the solar battery cell, and a DC converter for converting a voltage charged in the power storage device into respective voltages appropriate for circuits. Accordingly, an external power supply is not needed, and thus the electronic device can be used for a long period of time even at a place with no external power supply, so that convenience can be improved. As the power storage device, for example, one or more of a lithium ion secondary battery, a lithium ion capacitor, an electric double-layer capacitor, a redox capacitor, and the like can be used. For example, a lithium ion secondary battery and a lithium ion capacitor can be used together, whereby a power storage device which can charge or discharge at high speed and can supply electric power for a long time can be formed. The power storage device is not limited to the lithium ion secondary battery. As the power storage device, a secondary battery in which another alkali metal ion, alkaline earth metal ion, or the like is used as a mobile ion may be used. There is no limitation also on the lithium ion capacitor. As the power storage device, a capacitor in which another alkali metal ion, alkaline earth metal ion, or the like is used as a mobile ion may be used.

In the electronic devices of this embodiment, a display portion may have a touch panel function. The touch panel function can be added by mounting a touch panel unit on the display portion or by providing an optical detection circuit for a pixel.

By applying the display device described in the above embodiments to display portions of electronic devices, electronic devices with low power consumption can be provided.

Note that this embodiment can be combined with or replaced by any of the other embodiments as appropriate.

This application is based on Japanese Patent Application serial no. 2010-041544 filed with Japan Patent Office on Feb. 26, 2010, the entire contents of which are hereby incorporated by reference.

EXPLANATION OF REFERENCE

31: transistor, 32: transistor, 33: transistor, 34: transistor, 35: transistor, 36: transistor, 37: transistor, 38: transistor, 39: transistor, 40: transistor, 41: transistor, 101: driver circuit portion, 101a: first driver circuit, 101b: second driver circuit, 102: pixel portion, 102_K: pixel, 201: driver circuit portion, 201a: CPU, 201b: display control circuit, 201c: scan signal line driver circuit, 201d: image signal line driver circuit, 202: pixel portion, 202_K: pixel, 203: scan signal line, 204: image signal line, 205: transistor, 206: light source portion, 211a: interface, 211b: reference clock signal generation circuit, 211c: counting circuit, 211d: latch circuit, 211e: memory circuit, 211f: arithmetic circuit, 211g: output circuit, 221: transistor, 222: liquid crystal element, 223: capacitor, 311: period, 312: period, 400a: substrate, 400b: substrate, 400c: substrate, 400d: substrate, 401a: conductive layer, 401b: conductive layer, 401c: conductive layer, 401d: conductive layer, 402a: insulating layer, 402b: insulating layer, 402c: insulating layer, 402d: insulating layer, 403a: oxide semiconductor layer, 403b: oxide semiconductor layer, 403c: oxide semiconductor layer, 403d: oxide semiconductor layer, 405a: conductive layer, 405b: conductive layer, 405c: conductive layer, 405d: conductive layer, 406a: conductive layer, 406b: conductive layer, 406c: conductive layer, 406d: conductive layer, 407a: oxide insulating layer, 407c: oxide insulating layer, 409a: protective insulating layer, 409b: protective insulating layer, 409c: protective insulating layer, 427: insulating layer, 447: insulating layer, 530: oxide semiconductor film, 1001: display portion, 1002: operation portion, 1101: display portion, 1102: operation button, 1103: external input terminal, 1201: housing, 1202: display portion, 1203: speaker, 1204: LED lamp, 1205: pointing device, 1206: connection terminal, 1207: keyboard, 1301: display portion, 1302: display portion, 1303: speaker, 1304: connection terminal, 1305: LED lamp, 1306: microphone, 1307: recording medium reading portion, 1308: operation button, 1309: sensor, 1401: housing, 1403: housing, 1405: display portion, 1407: display portion, 1411: hinge, 1421: power button, 1423: operation key, 1425: speaker, 1501: housing, 1502: display portion, 1503: speaker, 1504: LED lamp, 1505: operation button, 1506: connection terminal, 1507: sensor, 1508: microphone, 1509: support base, 4001: substrate, 4005: sealant, 4006: substrate, 4008: liquid crystal layer, 4012: transistor, 4014: transistor, 4015: conductive layer, 4016: conductive layer, 4017: liquid crystal element, 4018: FPC, 4019: anisotropic conductive layer, 4020: insulating layer, 4021: insulating layer, 4024: insulating layer, 4025: planarization layer, 4030: conductive layer, 4031: conductive layer, 4032: insulating layer, 4033: insulating layer, and 4035: insulating layer.

The invention claimed is:

1. A method for driving a display device comprising a driver circuit portion and a pixel portion comprising n (n is a natural number) pixels, the driver circuit portion comprising a first driver circuit and a second driver circuit, wherein each of the n pixels comprises a transistor, and wherein a channel formation region of the transistor comprises an oxide semiconductor layer, comprising the step of:

performing operation N (N is a natural number) times in a still image display mode for displaying a still image in the pixel portion, the operation comprising:
supplying a first driving signal and a first power supply voltage to the first driver circuit;
supplying a second driving signal and a second power supply voltage to the second driver circuit;
supplying a scan signal to the n pixels from the first driver circuit;
supplying an image signal to the n pixels from the second driver circuit;
stopping supply of the second driving signal and the second power supply voltage to the second driver circuit; and
holding an image of the pixel portion based on the image signal as the still image, wherein in the case where N is greater than or equal to 2, a K-th (K is a natural number greater than or equal to 2 and less than or equal to N) period of stopping supply of the second driving signal and the second power supply voltage to the second driver circuit is set longer than a (K−1)-th period of stopping supply of the second driving signal and the second power supply voltage to the second driver circuit.

2. The method for driving a display device, according to claim 1, wherein the operation further comprises stopping supply of the first driving signal and the first power supply voltage to the first driver circuit after supplying the image signal to the n pixels.

3. The method for driving a display device, according to claim 1, wherein in the case where an operation signal is input to the display device in a (K+1)-th period of holding the image, supply of the first driving signal, and the first power supply voltage to the first driver circuit is started and supply of the second driving signal, and the second power supply voltage to the second driver circuit is started, and the image signal is supplied to the n pixels.

4. The method for driving a display device, according to claim 1,
wherein a carrier concentration in the oxide semiconductor layer is lower than $1 \times 10^{14}/cm^3$.

5. The method for driving a display device, according to claim 1,
wherein each of the n pixels comprises:
the transistor comprising a gate, a source, and a drain; and
a liquid crystal element,
wherein the gate is electrically connected to the first driver circuit,
wherein one of the source and the drain is electrically connected to the second driver circuit, and
wherein the other of the source and the drain is electrically connected to the liquid crystal element.

6. The method for driving a display device, according to claim 1, wherein the pixel portion has a moving image display mode for displaying a moving image by the n pixels and the still image display mode for displaying the still image by the n pixels.

7. The method for driving a display device, according to claim 1,
wherein the first driving signal includes a first start signal and a first clock signal, and
wherein the second driving signal includes a second start signal and a second clock signal.

8. The method for driving a display device, according to claim 1,
wherein off-state current per micrometer of a channel width of the transistor is 100 aA/μm.

9. The method for driving a display device, according to claim 1,
wherein the oxide semiconductor layer comprises indium, gallium, and zinc.

10. A method for driving a display device comprising a driver circuit portion and a pixel portion comprising n (n is a natural number) pixels, the driver circuit portion comprising a first driver circuit and a second driver circuit, wherein each of the n pixels comprises a transistor, and wherein a channel formation region of the transistor comprises an oxide semiconductor layer, comprising the step of:
performing operation N (N is a natural number) times in a still image display mode for displaying a still image in the pixel portion, the operation comprising:
supplying a first driving signal and a first power supply voltage to the first driver circuit;
supplying a second driving signal and a second power supply voltage to the second driver circuit;
supplying a scan signal to the n pixels from the first driver circuit;
supplying an image signal to the n pixels from the second driver circuit;
stopping supply of the second driving signal and the second power supply voltage to the second driver circuit; and
holding an image of the pixel portion based on the image signal as the still image,
wherein in the case where N is greater than or equal to 2, a K-th (K is a natural number greater than or equal to 2 and less than or equal to N) period of stopping supply of the second driving signal and the second power supply voltage to the second driver circuit is set longer than a (K−1)-th period of stopping supply of the second driving signal and the second power supply voltage to the second driver circuit, and
wherein an interval between the K-th period of supplying the image signal to the n pixels and the (K−1)-th period of supplying the image signal is 10 seconds or longer.

11. The method for driving a display device, according to claim 10, wherein the operation further comprises stopping supply of the first driving signal and the first power supply voltage to the first driver circuit after supplying the image signal to the n pixels.

12. The method for driving a display device, according to claim 10, wherein in the case where an operation signal is input to the display device in a (K+1)-th period of holding the image, supply of the first driving signal and the first power supply voltage to the first driver circuit is started and supply of the second driving signal and the second power supply voltage to the second driver circuit is started, and the image signal is supplied to the n pixels.

13. The method for driving a display device, according to claim 10,
wherein each of the n pixels comprises:
the transistor comprising a gate, a source, and a drain; and
a liquid crystal element,
wherein the gate is electrically connected to the first driver circuit,
wherein one of the source and the drain is electrically connected to the second driver circuit, and
wherein the other of the source and the drain is electrically connected to the liquid crystal element.

14. The method for driving a display device, according to claim 10, wherein the pixel portion has a moving image display mode for displaying a moving image by the n pixels and the still image display mode for displaying the still image by the n pixels.

15. The method for driving a display device, according to claim 10,
wherein the first driving signal includes a first start signal and a first clock signal, and
wherein the second driving signal includes a second start signal and a second clock signal.

16. The method for driving a display device, according to claim 10, wherein off-state current per micrometer of a channel width of the transistor is 100 aA/μm.

17. The method for driving a display device, according to claim 10, wherein the oxide semiconductor layer comprises indium, gallium, and zinc.

18. The method for driving a display device, according to claim 10, wherein a carrier concentration in the oxide semiconductor layer is lower than $1 \times 10^{14}/cm^3$.

19. A display device comprising:
a CPU supplied with an operation signal;
a display control circuit;
a first driver circuit; and
a second driver circuit; and
n (n is a natural number) pixels,
wherein the CPU is configured to generate a first control signal and a second control signal in accordance with the operation signal, and the CPU is configured to supply the first control signal and the second control signal to the display control circuit,
wherein the display control circuit is configured to supply a first start signal, a first clock signal and power supply voltage to the first driver circuit in accordance with the first control signal, and the display control circuit is configured to supply a second start signal, a second clock signal and power supply voltage to the second driver circuit in accordance with the second control signal,
wherein the first driver circuit is configured to supply a scan signal to the n pixels,
wherein the second driver circuit is configured to supply an image signal to the n pixels, and
wherein the CPU comprises:
  a counting circuit;
  a latch circuit;
  an arithmetic circuit; and
  an output circuit,
wherein the counting circuit is configured to count the number of pulses of a reference clock signal in each period set in accordance with the operation signal and the counting circuit is configured to supply data of counted value to the latch circuit in each period as a signal,
wherein the latch circuit is configured to supply the data of counted value to the arithmetic circuit after holding the data of counted value for a certain period,
wherein the arithmetic circuit is configured to generate signals in accordance with the data of counted value and the arithmetic circuit is configured to supply the signals to the output circuit,
wherein the output circuit is configured to adjust and supply the signals to the display control circuit as the first control signal and the second control signal, and
wherein the n pixels are controlled in accordance with the scan signal and the image signal, and
wherein each of the n pixels comprises a transistor, and
wherein a channel formation region of the transistor comprises an oxide semiconductor layer.

20. The display device according to claim 19,
wherein the CPU further comprises a memory circuit configured to store data of an interval between image rewriting operations in displaying a still image, and
wherein the memory circuit is configured to supply the data of the interval to the arithmetic circuit.

21. The display device according to claim 19, wherein the CPU further comprises a reference clock signal generation circuit configured to supply the reference clock signal to the counting circuit.

22. The display device according to claim 19,
wherein the CPU further comprises an interface, and
wherein the operation signal is input to the CPU through the interface.

23. The display device, according to claim 19,
wherein a carrier concentration in the oxide semiconductor layer is lower than $1\times10^{14}/cm^3$.

24. The display device according to claim 19,
wherein each of the n pixels comprises:
  the transistor comprising a gate, a source, and a drain; and
  a liquid crystal element,
wherein the gate is electrically connected to the first driver circuit,
wherein one of the source and the drain is electrically connected to the second driver circuit, and
wherein the other of the source and the drain is electrically connected to the liquid crystal element.

* * * * *

UNITED STATES PATENT AND TRADEMARK OFFICE
CERTIFICATE OF CORRECTION

PATENT NO. : 8,786,588 B2
APPLICATION NO. : 13/030184
DATED : July 22, 2014
INVENTOR(S) : Jun Koyama and Shunpei Yamazaki It is certified that error appears in the above-identified patent and that said Letters Patent is hereby corrected as shown below:

In the Specification

Column 9, line 2 – replace "1016" with --101b--;

Column 13, line 24 – replace "all" with --an--;

Column 22, line 19 – after "off" replace "," with --;--;

Column 22, line 36 – replace "shrift" with --shift--;

Column 33, line 47 – replace "all" with --an--;

Column 33, line 50 – replace "all" with --an--;

Column 38, line 50 – replace "pan" with --part--; and

Column 41, line 15 – replace "portions" with --portion--.

Signed and Sealed this
Ninth Day of June, 2015

Michelle K. Lee
*Director of the United States Patent and Trademark Office*